(12) United States Patent
Weisz et al.

(10) Patent No.: US 10,350,448 B2
(45) Date of Patent: Jul. 16, 2019

(54) BIMANUAL ARM TRAINER

(71) Applicant: Mirrored Motion Works, INC., Cary, NC (US)

(72) Inventors: Donald J. Weisz, Cary, NC (US); Preeti Raghavan, Brooklyn, NY (US); Frank Speranza, Warminster, PA (US)

(73) Assignee: MIRRORED MOTION WORKS, INC., Cary, NC (US)

( * ) Notice: Subject to any disclaimer, the term of this patent is extended or adjusted under 35 U.S.C. 154(b) by 615 days.

(21) Appl. No.: 15/074,719

(22) Filed: Mar. 18, 2016

(65) Prior Publication Data
US 2016/0271438 A1 Sep. 22, 2016

Related U.S. Application Data

(60) Provisional application No. 62/265,686, filed on Dec. 10, 2015, provisional application No. 62/134,683, filed on Mar. 18, 2015.

(51) Int. Cl.
*A63B 21/00* (2006.01)
*A61H 1/02* (2006.01)
(Continued)

(52) U.S. Cl.
CPC ....... *A63B 21/4019* (2015.10); *A61H 1/0274* (2013.01); *A63B 21/0023* (2013.01); *A63B 21/00069* (2013.01); *A63B 21/00178* (2013.01); *A63B 21/0552* (2013.01); *A63B 21/156* (2013.01); *A63B 21/159* (2013.01); *A63B 21/4017* (2015.10); *A63B 21/4021* (2015.10); *A63B 21/4035* (2015.10); *A63B 21/4049* (2015.10); *A63B 23/03541* (2013.01);
(Continued)

(58) Field of Classification Search
USPC ...... 434/247, 258; 482/44, 92, 93, 111, 112, 482/114, 116, 135, 136, 139; 601/33
See application file for complete search history.

(56) References Cited

U.S. PATENT DOCUMENTS

| 3,782,719 A | 1/1974 | Kuhlman |
| 4,679,548 A | 7/1987 | Pecheux |

(Continued)

FOREIGN PATENT DOCUMENTS

| DE | 102006024942 | 12/2007 |
| WO | WO 2009/070042 | 6/2009 |

*Primary Examiner* — Kurt Fernstrom
(74) *Attorney, Agent, or Firm* — Leason Ellis LLP

(57) ABSTRACT

A bimanual arm trainer that provides therapeutic bimanual repetitive exercise to improve upper body movement and flexibility has a top support that is elevated relative to a ground surface. The trainer further includes: (a) first and second arm holders that are pivotable relative to the top support; and (b) first and second arm holder housings that are pivotably coupled to the top support and can be moved into a plurality of different positions and locked in place in one of the plurality of different positions relative to the top support. The first arm holder is pivotably coupled to the first arm holder and the second arm holder is pivotably coupled to the second arm holder. A reciprocating translation mechanism operatively connects the first and second arm holders such that the motion of one of the first and second arm holders is mirrored in the other of the first and second arm holders.

28 Claims, 12 Drawing Sheets

(51) Int. Cl.
*A63B 21/002* (2006.01)
*A63B 21/055* (2006.01)
*A63B 24/00* (2006.01)
*A63B 23/035* (2006.01)
*A63B 23/12* (2006.01)
*A63F 13/98* (2014.01)
*A63B 71/06* (2006.01)
*A63B 22/00* (2006.01)

(52) U.S. Cl.
CPC ...... *A63B 23/1209* (2013.01); *A63B 24/0006* (2013.01); *A63B 24/0062* (2013.01); *A63F 13/98* (2014.09); *A61H 2201/0192* (2013.01); *A61H 2201/1276* (2013.01); *A61H 2201/1638* (2013.01); *A61H 2201/1664* (2013.01); *A61H 2201/1676* (2013.01); *A61H 2201/501* (2013.01); *A61H 2201/5035* (2013.01); *A61H 2201/5043* (2013.01); *A61H 2201/5046* (2013.01); *A61H 2201/5061* (2013.01); *A61H 2201/5064* (2013.01); *A61H 2201/5069* (2013.01); *A61H 2201/5097* (2013.01); *A63B 21/4045* (2015.10); *A63B 22/0076* (2013.01); *A63B 23/1254* (2013.01); *A63B 24/0075* (2013.01); *A63B 2022/0082* (2013.01); *A63B 2024/0015* (2013.01); *A63B 2024/0071* (2013.01); *A63B 2024/0096* (2013.01); *A63B 2071/065* (2013.01); *A63B 2071/0625* (2013.01); *A63B 2071/0641* (2013.01); *A63B 2071/0644* (2013.01); *A63B 2071/0647* (2013.01); *A63B 2071/0652* (2013.01); *A63B 2071/0694* (2013.01); *A63B 2209/10* (2013.01); *A63B 2220/24* (2013.01); *A63B 2220/44* (2013.01); *A63B 2225/09* (2013.01); *A63B 2225/20* (2013.01); *A63B 2225/50* (2013.01)

(56) References Cited

U.S. PATENT DOCUMENTS

| | | | |
|---|---|---|---|
| 4,945,902 | A | 8/1990 | Dorer et al. |
| 5,137,504 | A | 8/1992 | Mangini |
| 5,303,696 | A | 4/1994 | Boice |
| 5,451,191 | A | 9/1995 | Beenken |
| 5,738,613 | A | 4/1998 | Clayton |
| 5,820,519 | A | 10/1998 | Slenker |
| 5,876,362 | A | 3/1999 | Root |
| 6,149,612 | A * | 11/2000 | Schnapp ............ A61H 1/0285 482/44 |
| 6,402,665 | B1 | 6/2002 | Edward |
| 6,554,234 | B2 | 4/2003 | Holdren |
| 7,121,981 | B2 * | 10/2006 | Whitall ............... A61H 1/0274 482/8 |
| 7,137,959 | B2 | 11/2006 | Phillips |
| 7,850,579 | B2 | 12/2010 | Whitall et al. |
| 7,976,444 | B2 | 7/2011 | Binns et al. |
| 9,095,492 | B2 * | 8/2015 | Verkaaik ............. A61H 1/0274 |
| 9,123,256 | B2 * | 9/2015 | Byblow ............... A61H 1/0274 |
| 10,058,729 | B2 * | 8/2018 | Choi .................. A63B 21/4035 |
| 2003/0073939 | A1 | 4/2003 | Taylor et al. |
| 2005/0159683 | A1 * | 7/2005 | Kuo ..................... A61H 1/0281 601/5 |
| 2011/0021955 | A1 | 1/2011 | Byblow et al. |
| 2011/0300994 | A1 | 12/2011 | Verkaaik et al. |
| 2014/0287390 | A1 | 9/2014 | Byblow et al. |
| 2016/0367428 | A1 * | 12/2016 | Townsend ........... A61H 1/0237 |

* cited by examiner

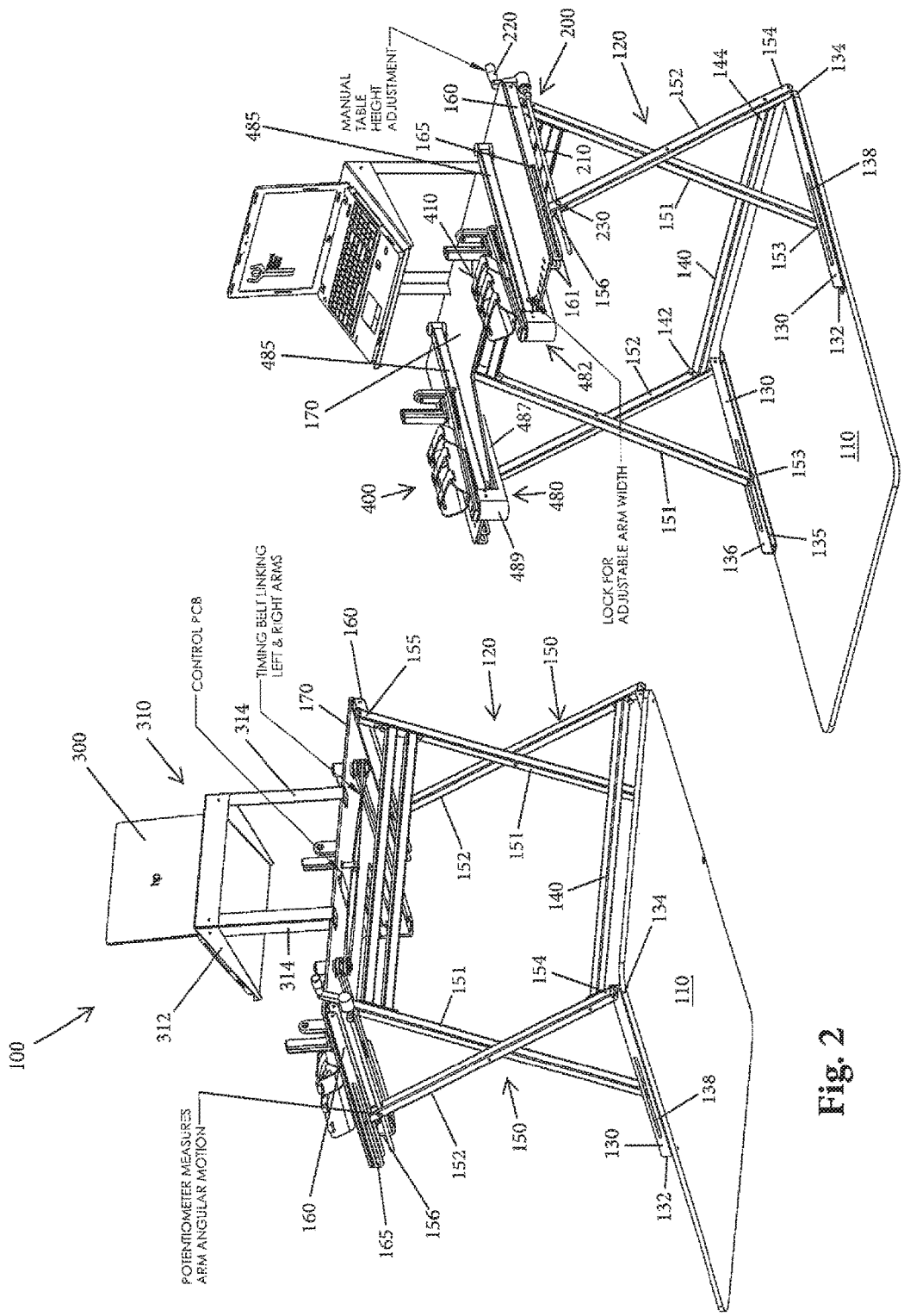

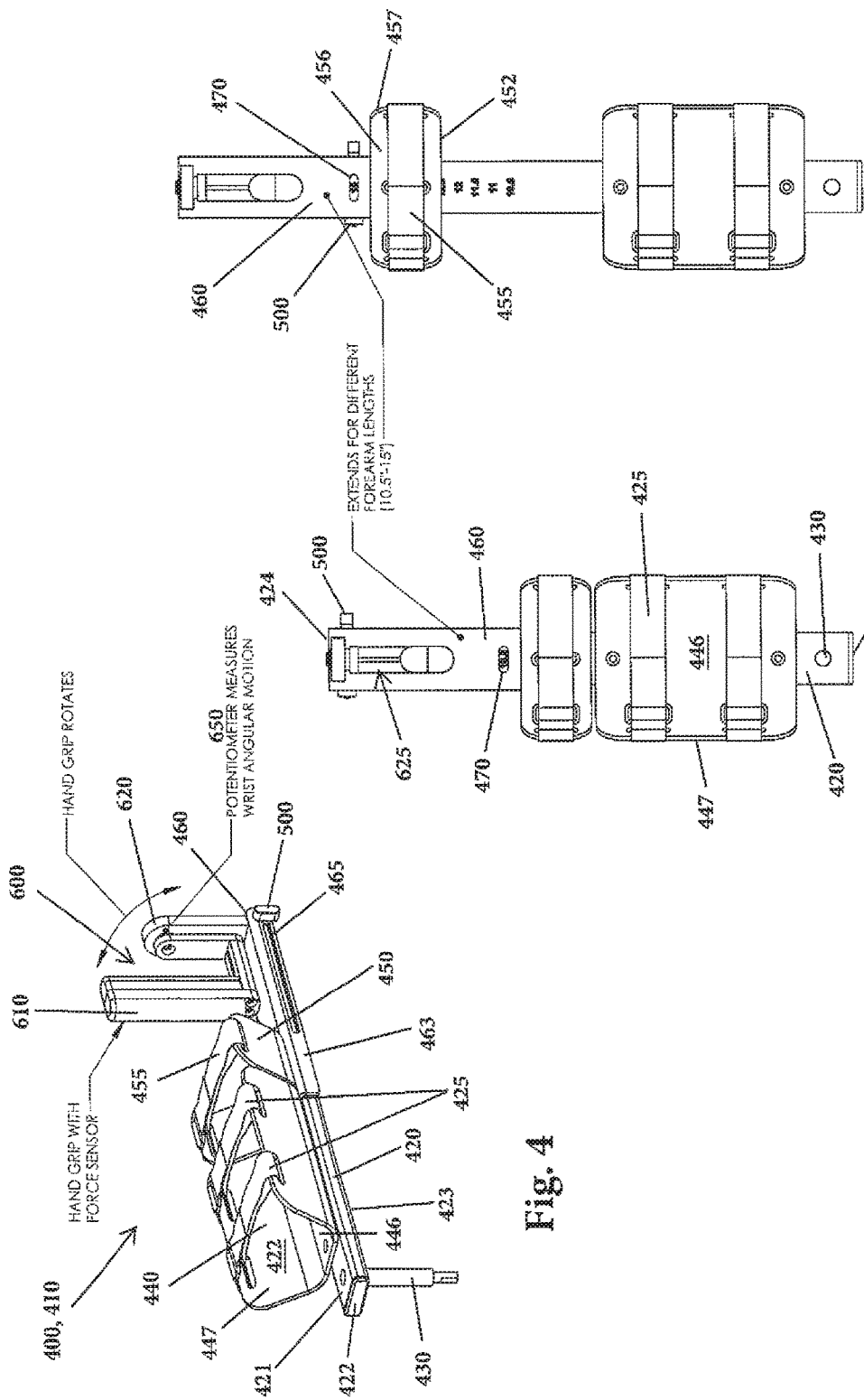

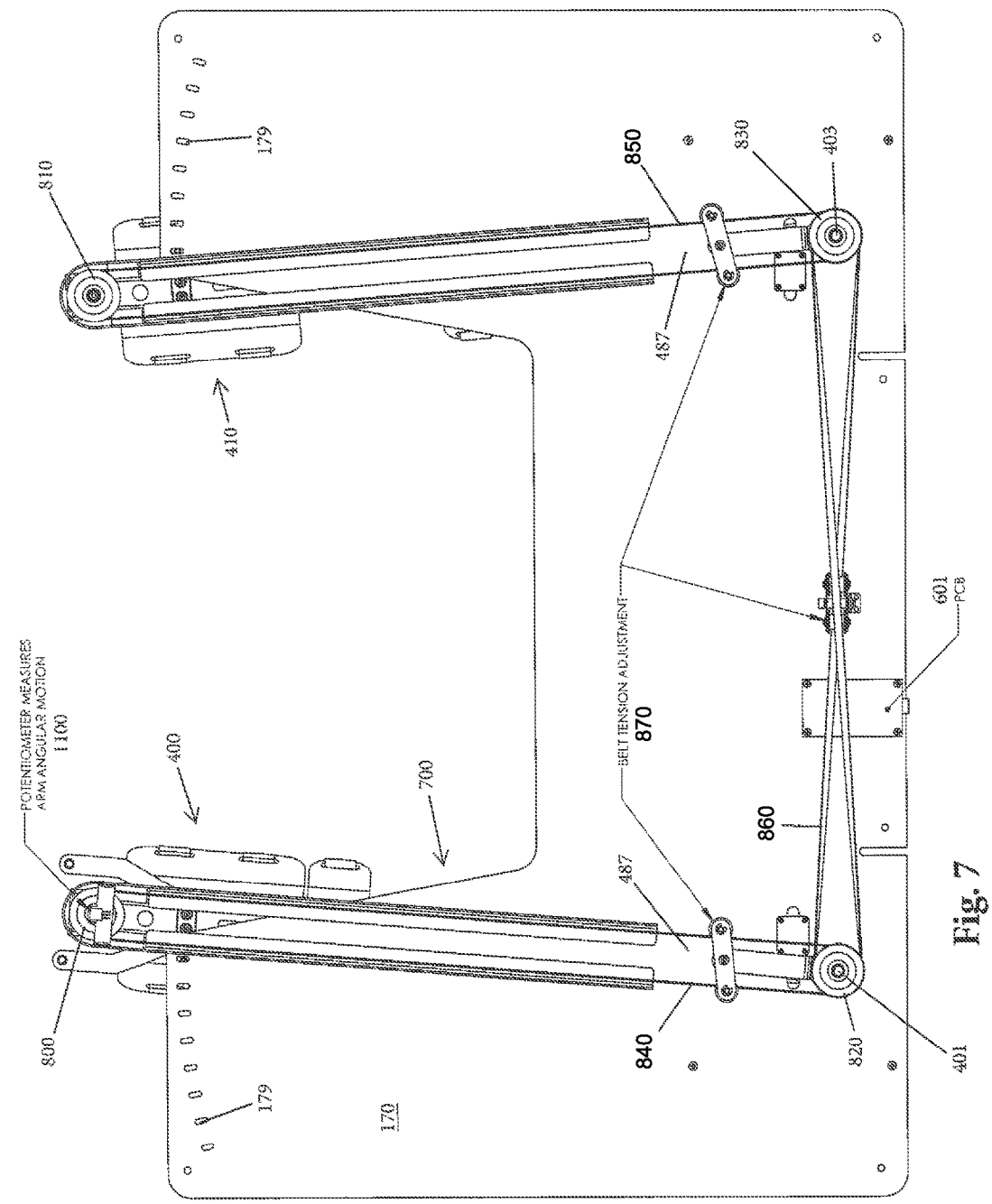

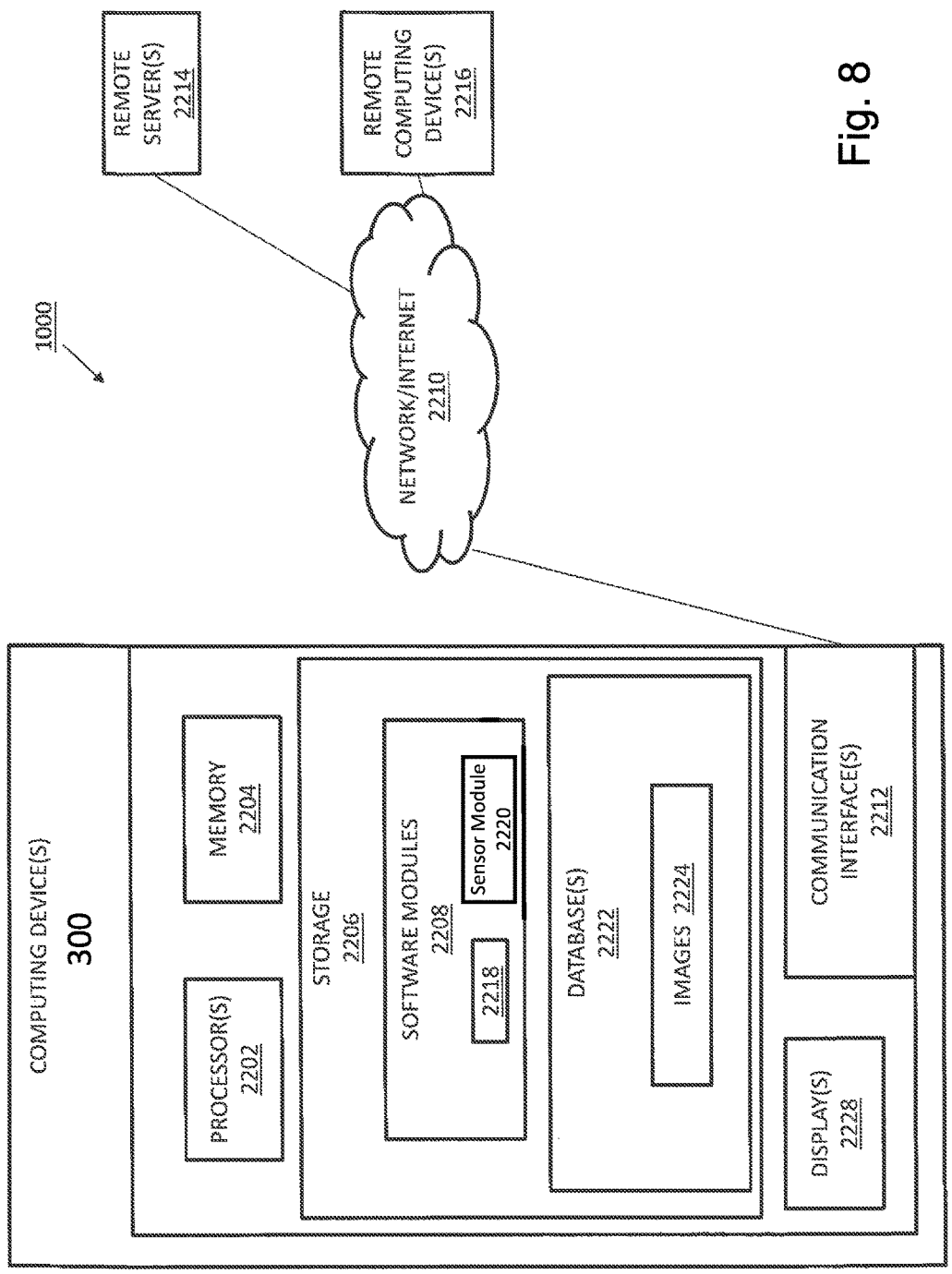

BIMANUAL ARM TRAINER

CROSS-REFERENCE TO RELATED APPLICATIONS

The present invention claims priority to U.S. provisional patent application Ser. No. 62/134,683, filed Mar. 18, 2015, and U.S. provisional patent application Ser. No. 62/265,686, filed Dec. 10, 2015, each of which is hereby incorporated by reference in its entirety.

TECHNICAL FIELD

The present invention relates to rehabilitative devices and in particular, the present invention relates to rehabilitative devices that are configured to use the motion of an unaffected (or less affected) body part to "train" the affected body part and thereby incorporate the brain motor system in the rehabilitation process.

BACKGROUND

While technology continues to make rapid advancements in the medical field, there are still a number of diseases and ailments that strike a vast number of adults and can lead to death. For example, a stroke is currently the third leading cause of death in American and is also unfortunately a leading cause of adult disability. A stroke, which also referred to as a "brain attack," occurs when a blood clot blocks an artery (a blood vessel that carries blood from the heart to the body) or a blood vessel (a conduit through which blood moves throughout the body) ruptures and thereby interrupts blood flow an area of the brain. When either of these events occurs, brain cells begin to die and brain damage occurs.

As a result of the interruption in blood flow and brain cells dying during a stroke, the affected area of the brain is unable to function and abilities controlled by that area of the brain are lost. These abilities include but are not limited to movement (ability to move one or more limbs on one side of the body), speech (ability to understand or formulate speech), memory, and sight (ability to see one side of the visual field). How a stroke patient is affected depends on where the stroke occurs in the brain and how much of the brain is damaged. For example, an individual who has a small stroke may experience only minor problems such as weakness of an arm or leg. Individuals who have larger strokes may be paralyzed on one side or lose their ability to speak. Some people recover completely from strokes, but more than ⅔ of survivors will have some type of disability for the rest of their lives. More specifically, many survivors suffer from residual neurological deficits that persistently impair function. In particular, dysfunction from upper extremity (UE) hemiparesis impairs performance of many daily activities such as dressing, bathing, self-care, and writing and as a result, functional independence is greatly reduced. In fact, studies show that only 5% of adults regain full arm function after stroke and unfortunately, 20% regain no functional use.

For a person that survives a stroke, the person will most likely undergo stroke rehabilitation which is the process by which patients with disabling strokes undergo treatment to help the patients return to a normal life as much as possible by regaining and relearning the skills of everyday living. This can be a very long and difficult process and therefore is very challenging and difficult for the patient and all loved ones. As a result, stroke rehabilitation also aims to help the survivor understand and adapt to the difficulties ahead, prevent secondary complications and educate family members to play a supporting role and assist the survivor as much as possible and where needed.

Depending upon the severity of the stroke, the rehabilitation program will vary and thus the makeup of the rehabilitation team will also vary. In any event, a rehabilitation team is usually multidisciplinary since it involves staff with different skills that are all working together to help the patient recover and relearn and develop old skills and abilities. The rehabilitation staff can include but is not limited to nursing staff, physiotherapy, occupational therapy, speech and language therapy, and usually a physician trained in rehabilitation medicine. Other rehabilitation programs will include assist from psychologists, social workers, and pharmacists since unfortunately, a large number of patients manifest post-stroke depression, and other social problems related to their disability. However, most stroke patients undergo physical therapy (PT) and occupational therapy (OT) and therefore, these are considered cornerstones of the rehabilitation process. During the rehabilitative process, assistive technology, such as a wheelchair, walkers, canes and orthosis are commonly used to assist the patient and to compensate for impairments. Speech and language therapy is provided for patients with problems understanding speech or written words, problems forming speech and problems with swallowing. While PT and OT have overlapping areas of working, their main attention fields are different in that PT involves re-learning functions such as transferring, walking and other gross motor functions. In contrast, OT focuses on exercises and training to help relearn everyday activities known as the activities of daily independent living, such as eating, drinking, dressing, bathing, cooking, reading and writing, and toileting, etc.

It is generally accepted in the medical community that there is an important treatment window for beginning the rehabilitative process. Traditionally, methods of stroke rehabilitation have been focused on the first three months after stroke and consist largely of passive (nonspecific) movement approaches or compensatory training of the nonparetic arm. This time window is in part based on and consistent with natural history studies of stroke recovery that show a plateau after three months, although it has been demonstrated that recovery can occur well beyond this window into the late chronic phase several years post-stroke. Features of the motor impairment are however different in the period immediately after stroke (i.e. the first 3 months or so) and in the later post-stroke period (after 3 months). In the beginning there is predominantly weakness, but later muscular overactivity develops in certain muscle groups that leads to abnormal posturing and masks strength gains in the non-overactive muscle groups.

Much of the therapy provided by PTs and OTs in the first 3 months is hands-on, and is spent in passively maintaining range-of-motion in the joints of the affected side so as to prevent deformity and in teaching compensatory strategies to preserve functional independence to the extent possible using the unaffected limb, assistive devices and the like. Little time and effort is expended in trying to restore muscle activation/strength in the paralyzed affected limb. With respect to rehabilitative treatment for people suffering with chronic hemiparetic arm dysfunction, there are a number of new devices for upper arm rehabilitation and training. Most of these devices concentrate on the affected arm and use mechanical devices/robotics and electrical stimulation to controllably move the affected arm. For example, there are robotic devices that facilitate movement of the targeted muscle group or groups by using a robot to sense and then stimulate appropriately if the patient is not able to complete the intended movement. These new rehabilitation devices were introduced to allow increased amounts of 'practice' to train the affected limb while reducing the burden on the therapist. However, these devices are overly complex, expensive (since they use computers (virtuals) and robotics), and "train" the affected limb by producing passive movements in one or more joints using an external source of energy. The complexity and costs of these devices prevent them from being used in a number of settings, including a home or remote clinic that does not have sufficient resources for purchase of expensive equipment, etc.

A number of recent studies have shown that recovery is an "active" rather than a "passive" process where it is the brain that needs to be trained in conjunction with movements of the limb. Over the last few decades it has been shown that there is a complex interaction between the two sides of the brain in the control of movement of one limb. Both sides of the brain contribute to the control of each limb, but one side is usually "inhibited" in a healthy individual. However this inhibition is removed when one side is damaged, and as a result the undamaged side of the brain may play a greater role in the recovery of the affected limb. Existing rehabilitation devices are not focused on harnessing the already available brain activity from the unaffected side to train affected arm movements.

SUMMARY

A bimanual arm trainer is provided and is configured to provide therapeutic bimanual repetitive exercise to improve upper body movement and flexibility. The bimanual arm trainer includes a top support (e.g. table) having an upper surface and an opposing lower surface, with the top surface being elevated relative to a ground surface. The trainer further includes: (a) first and second arm holders that are pivotable relative to the top support; and (b) first and second arm holder housings that are pivotably coupled to the top support and can be moved into a plurality of different positions and locked in place in one of the plurality of different positions relative to the top support. The first arm holder is pivotably coupled to the first arm holder and the second arm holder is pivotably coupled to the second arm holder. The trainer also includes a reciprocating translation mechanism that operatively connects the first and second arm holders such that the motion of one of the first and second arm holders is mirrored in the other of the first and second arm holders.

BRIEF DESCRIPTION OF THE DRAWING FIGURES

FIG. 1 is top and side perspective view of a bimanual arm trainer in accordance with one embodiment of the present invention;

FIG. 2 is a bottom and side perspective view of the bimanual arm trainer;

FIG. 4 is a side perspective view of a hand grip;

FIG. 5 is a top plan view of the hand grip in a first (retracted) position;

FIG. 6 is a top plan view of the hand grip in a second (extended) position;

FIG. 7 is a bottom plan view of the working components of the trainer;

FIG. 8 is a high level diagram illustrating an exemplary configuration of a computer implemented system for designing and/or manufacturing customizable pull mechanisms in accordance with one or more embodiments of the present invention;

DETAILED DESCRIPTION OF CERTAIN EMBODIMENTS

Figure 3:
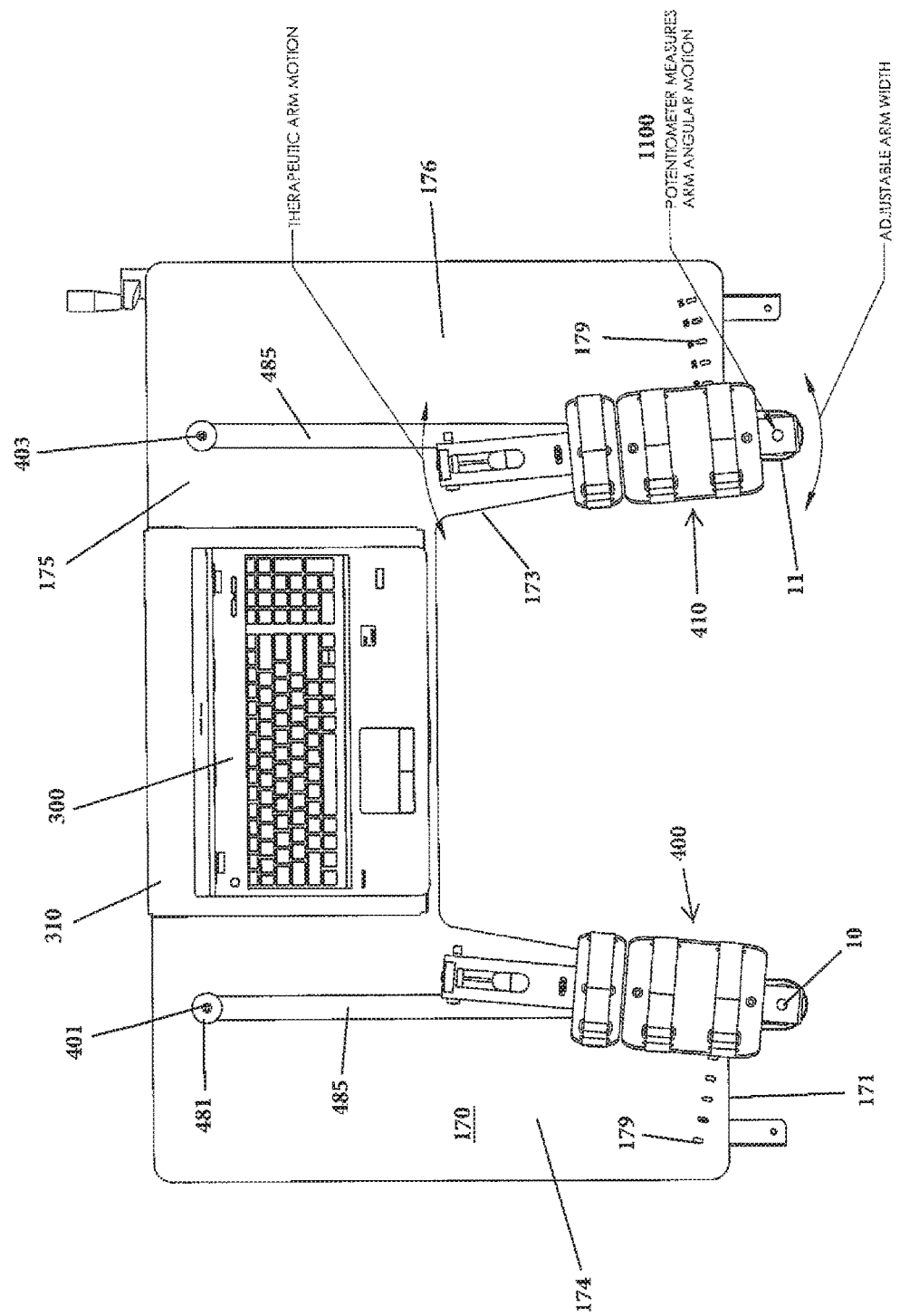
FIG. 3 is a top plan view of the bimanual arm trainer.

FIGS. 1-6 illustrate a bimanual arm trainer 100 in accordance with one embodiment of the present invention. The bimanual arm trainer 100 is intended for use as an arm rehabilitation system that provides therapeutic bimanual repetitive exercise to improve user's upper body movement and flexibility after an ailment such as a stroke or other condition. FIGS. 1 and 2 show the bimanual arm trainer 100 resting on a base 110 such as a platform that can be placed on the ground or floor, etc. However, it will be appreciated that the base 110 is not critical and instead the frame of the bimanual arm trainer 100 can be mounted directly to the ground surface. The base 110 can be in the form of a planar wood platform or the like.

The bimanual arm trainer 100 includes a frame 120 to which the components of the bimanual arm trainer 100 are attached and as shown, the frame 120 can be attached to the base 110. In the illustrated embodiment, the frame 120 includes a pair of spaced ground supports 130, a cross member 140, a pair of side supports 150, a pair of upper supports 160, and a top planar surface 170.

Each ground support 130 has a first end 132 and an opposing second end 134 and the ground support can be in the form of a bracket (e.g., L-shaped bracket) that has a first wall 135 that seats flush against and is fixedly mounted to the base 110 or the ground surface. The bracket includes a second wall 136 that extends upwardly from the first wall 135 with a right angle being defined between the first and second walls 135, 136. The second wall 136 can thus be thought of as being a vertical wall. The second wall 136 includes an internal, closed ended slot 138 that extends along a length of the second wall 136.

Each side support 150 includes a first support 151 and a second support 152. The first support 151 is a linear support that has a first end 153 and an opposing second end 155 and similarly, the second support 152 is a linear support that has a first end 154 and an opposing second end 156. The supports 151, 152 are arranged in a criss-cross manner (e.g., so as to assume an X-shape) and the supports 151, 152 are pivotally attached to one another using a fastener (e.g., a pin) or the like. The supports 151, 152 are arranged such that the first support 151 is positioned on the inner side of the second wall 136, while the second support 152 is positioned on the outer side of the second wall 136. The first end 153 of the first support 151 is slidingly coupled to the second wall 136 by a fastener (e.g., a rod or shaft) that passes through the first end 153 and through the slot 138 formed in the second wall 136 and is securely coupled thereto (e.g., use of a cotter pin with the rod). The fastener that attached the two structures thus travels within the slot 138 with the ends of the slot 138 defining the degree of travel. The first end 154 of the second support 152 is attached (e.g., pivotally attached) to the second end 134 of the ground support 130 using a fastener or the like.

Since the supports 151, 152 are arranged in an X-shape and are pivotally attached to one another, the supports 151, 152 can operate similar to a scissor jack in that the sliding action of the first supports 151 and pivoting of the second supports 152 allow the top planar surface 170 to be raised and lowered relative to the ground surface (base 110).

The cross member 140 can be in the form of a cross bar that has a first end 142 and an opposing second end 144. The first end 142 is attached to one of the second supports 152 and the second end 144 is attached to the other of the second supports 152.

The upper supports 160 are attached to the top planar surface 170 and are also coupled to the second ends 155, 156. As illustrated, the upper supports 160 can be mounted to the underside of the top planar surface 170. The upper supports 160 can share some similarities with the ground supports 130 as discussed herein. In particular, each upper support 160 can be in the form of a bracket, such as a U-shaped bracket with the base portion thereof attached to the top planar surface 170 and the two spaced legs 161 extending downwardly therefrom. A central channel or space 163 is formed between the rails 161. The legs 161 can be thought of as being rails. Each of the rails 161 includes an internal, closed ended slot 165 that extends along a length of the rail 161. When the support 160 is defined by a pair of rails 161, the slot 165 is formed in each rail 161.

The slots 165 and slots 138 are positioned in relation to one another and more particularly, the slots 165 are disposed above the slots 138. The slots 165, 138 are thus in overlapping manner on each side of the frame. The second end 156 of each of the second supports 152 is coupled to the upper supports 160 by a fastener (e.g., a pin) that passes through an opening in the second end 156 and through the respective slot 165. As shown, the second end 156 can be disposed between the two rails 161 in the space 163 and the pin passes through the one slot 165 in one rail through the opening in the second end 156 and then through the other slot in the other rail 161.

In the illustrated embodiment, the supports 151, 152 have a general square shape.

It will be appreciated that the upper support 160 does not have to be in the form of a U-shaped bracket can but can instead be in the form of two parallel rails 161 that are spaced apart to define a central channel therebetween.

The supports 130, 160 thus define a track in which a respective end of one of the supports 151, 152 can slidingly travel to allow the X-shaped combined supports 130, 160 to raise and lower the planar support surface 170. As the planar support surface 170 is raised, the respective ends of the supports 151, 152 slide in the tracks (in the slots 138, 165) toward the cross bar 140. Conversely, when the planar support surface 170 is lowered, the respective ends of the supports 151, 152 slide in the tracks (in the slots 138, 165) in a direction away from the cross bar 140.

The illustrated embodiment, includes a mechanism 200 to manually lower and raise the planar support surface 170.

This mechanism 200 thus allows a user to adjust the overall height of the planar support surface 170 (table). The mechanism 200 can be in the form of a hand crank mechanism in the form of a linear actuator. Any number of different types of linear actuators can be used as long as the rotation of the mechanism causes linear movement of one of the supports 151. The mechanism 200 has a drive shaft 210 that has a handle (hand crank) 220 at one end and at the other end includes a threaded portion. One of the supports 152 (the one on the right side) includes a through hole 230 (slot) that passes there through and within the hole 230, second threads are formed. The thread of the drive shaft 210 mate with the threads associated with the support 152 such that when the drive shaft 210 is driven (rotated) in a first direction, the support 152 is driven in a first direction (i.e., away from the cross bar) and conversely, when the drive shaft 210 is driven (rotated) in the opposite second direction, the support 152 is driven in a second direction. The linear movement in either direction results in a change in the angle between the crossed legs (supports 151, 152). Raising the table (support 170) is accomplished by narrowing the angle of the legs 151, 152, while lowering the table is accomplished by widening the angle.

It will be appreciated that several types of linear actuator are a traveling nut linear actuator and a worm drive; however, there are many other types of linear actuators that can work in the present invention. In other words, any suitable actuator can be used which operates such that rotation of the drive shaft 210 is translated into linear movement of the support (leg) 152.

Some or all of the frame parts can be formed of metal parts or other suitable materials, including some plastics.

The table 170 is constructed to allow a user to sit thereat. In particular, the table 170 can include a cut out 173 along a front edge 171 of the table 170. The cut out 173 defines a first side portion 174, a center portion 175, and a second side portion 176. The first and second side portions 174, 176 are mirror images relative to one another.

The table 170 can be formed of any number of different materials including but not limited to wood or plastic, etc.

The bimanual arm trainer 100 can also include a personal computing device 300 that can be disposed on a stand 310. The stand 310 can be adjustable relative to the table 170 in that the height of the stand 310 can be adjusted. The stand 310, as shown, includes a top surface 312 and a pair of legs 314. The legs 314 can be attached to the table 170. The top surface 312 can be angled to better position the screen of the computing device 300 (e.g., a laptop).

The bimanual arm trainer 100 also includes first and second arm holders 400, 410 which can be in the form of arm saddles. The holders 400, 410 can be identical (or similar) to one another and therefore, like parts are numbered alike. The holder 400 can be thought of as being a left arm holder, while the holder 410 can be thought of as being a right arm holder. Each holder 400, 410 can include a base 420 having a first end 422 and an opposing second end 424. The base 420 includes a top surface 421 and a bottom surface 423. At the first end 422, a pin or shaft 430 extends downwardly from the bottom surface 423. The shaft 430 represents a pivot axis (axis of rotation) of the arm holder and therefore can be formed at a right angle to the base 420.

Each arm holder 400, 410 includes a first arm retaining part (trough) 440 and a second arm retaining part (trough) 450. The first arm retaining part 440 is intended to be a stationary part and is fixedly attached to the base 420, while the second arm retaining part 450 is a movable member that moves relative to the base 420 and the first arm retaining part 440. As shown, the first arm retaining part 440 can be in the form of a concave shaped body 442 which receives the arm of the user. The body 442 has an open top and the floor of the body 442 is attached to the base 420. Across the open top of the body 442, one or more fasteners 425 can be provided to securely position and retain the arm of the user in the body 442. The fasteners 425 can be in the form of one or more fabric straps. The straps can be of an elastic type or can be of an adjustable type (e.g., and include hook and loop material). The illustrated embodiment has two straps 425.

The illustrated body 442 is defined by a floor 446 and a pair of sides 447 that extend upwardly from the floor 446 at an angle. As shown, the floor 446 and sides 447 can be integral to one another.

The second arm retaining part 450 is similar to the first arm retaining part 440 but has a smaller size. As shown, the second arm retaining part 450 can be in the form of a concave shaped body 452 which receives the arm of the user. The body 452 has an open top and the floor of the body 452 is movably coupled to the base 420. Across the open top of the body 452, one or more fasteners 455 can be provided to securely position and retain the arm of the user in the body 452. The fasteners 455 can be in the form of one or more fabric straps. The straps can be of an elastic type or can be of an adjustable type (e.g., and include hook and loop material). The illustrated embodiment has one strap 455.

The illustrated body 452 is defined by a floor 456 and a pair of sides 457 that extend upwardly from the floor 456 at an angle. As shown, the floor 456 and sides 457 can be integral to one another.

The second arm retaining part 450 is coupled to a first end of the sliding rail 460 that is constructed to slidingly travel along and be locked relative to the base 420. For example, the rail 460 can be a U-shaped rail that fits over the rectangular shaped base 420 such that the legs 463 of the rail 460 are disposed external to the side edges of the base 420. The second arm retaining part is fixedly attached to a first end 462 of the rail 460.

One or both of the legs 463 of the rail 460 can include a longitudinal slot 465. The two longitudinal slots 465 are in registration (alignment) with one another. The sliding of the rail 460 relative to the base 420 allows the overall length of the combined rail 460/base 420 to be changed. FIG. 5 shows the arm holder in a retracted position, while FIG. 6 shows it in an extended position.

The rail 460 also includes a locating feature 470 that allows the user to set the rail 460 and second arm retaining part 450 at one of a plurality of set positions. The feature 470 can be in the form of a window (slot) formed in the top surface of the rail 460 and permits the top surface of the base portion 420 to be viewed. Indicia, such as size indicia, can be listed on the top surface of the rail 460 and is aligned with the window 470 such that when the rail 460 is one position, the respective size indicia is visible to indicate to the user which position the arm holder is currently in.

A locking mechanism 500 can be provided for securely locking the rail 460 in a desired position. A fastener 500, such as a screw, or the like can be inserted through the slots 465 and through a threaded opening in the base 420. Once the rail 460 is in a desired position, the fastener 500 is simply tightened and this locks the rail 460 in place. Other types of fasteners 500 can be used.

Each arm holder can include a hand grip 600 that is rotatably (pivotably) coupled to the sliding rail 460. The hand grip 600 includes an upstanding post 610 that is pivotally attached to the fixed post 620 which is itself fixedly attached to rail 460. There is also a fixed post 620 formed at the second end of the rail 460. A space 625 is formed between the posts 610, 620 to allow receipt of the fingers of the user.

It will therefore be appreciated that the distance between the two troughs (first and second arm retaining parts) can be adjusted by sliding the distal trough (second arm retaining part) away from the proximal one and locking it in place with the fastener (pin). As mentioned, the length of the trough (the combined first and second arm retaining parts) is clearly displayed by a ruler which measures the distance from the pivot point to the hand grip. The distance from the pivot point to the hand grip can be adjusted for a woman who is in the 1.0 percentile for arm length of a man who is in the 99 percentile for arm length (i.e., length of between about 10.5 inches to about 15 inches).

A sensor device 650 can be provided for measuring certain user movements. In particular, the upstanding pivotable post 610 can be provided with a first sensor (e.g., a force sensor) and the upstanding fixed post 620 can include a potentiometer configured to measure wrist angular motion. A potentiometer is a simple electromechanical device that translates rotary or linear motion into a change in resistance and for many years has been a cornerstone of measurement, control, and position systems. As described herein, each of the sensors/measurement systems of the present invention is operatively connected to a main controller (processor) 601. The processor 601 can be in the form of a PCB disposed on the underside of the table 170.

Alternatively, a flat bar may be attached to the lateral surface of the hand grip for patents who cannot or should not clench their hands. In addition, in one embodiment, the flat bar can be configured such that the flat palm of the patient's weak arm can push and pull on the flat bar to move it back and forth during the rehabilitative exercise.

The two arm holders 400, 410 are mated to arm holder housings 480, 482. The housings 480, 482 can be identical or similar to one another and thus, like elements are numbered alike. The housing 480, 482 includes an elongated top portion 485 that extends across the top surface of the table 170 and terminates in an end 481 which is pivotally attached to the table 170. A shaft or the like can be used to pivotally attach the housing 480, 482 to the table 170. For example, the top portion 485 is located above the top surface of the table 170 and is free to move relative thereto (i.e., the top portion 485 pivots across the top surface).

The arm holder 400 thus pivots relative to the table 170 at a first pivot 401 and the arm holder 410 pivots relative to the table 170 at a second pivot 403. The pivots are located proximate the rear edge of the table 170.

The housing 480, 482 includes an elongated lower portion 487 that is disposed along the underside of the table and is free to move relative thereto. An end portion 489 connects the top and lower portions 485, 487. The end portion 489 is disposed external to the table 170 and more particularly, is spaced from a rear edge of the table 170. The shaft 430 of each holder 400, 410 passes through an opening in the respective end portion 489 and is coupled to a translation mechanism as described below. This arrangement allows the holders 400, 410 to pivot relative to the underlying housings 480, 482. The cutout and table 170 is formed such that the housings 480, 482 can pivot at the front pivot points 401, 403 in a sweeping manner without contacting the table 170 to allowing the spacing between holders 400, 410 to be selected (i.e., the table provides no interference).

The housings 480, 482 can thus assume different positions relative to the table 170 as discussed below. More specifically, the housing 480, 482 can be spaced (spread) a predetermined distance apart from one another to accommodate different sized users. As discussed below, a locking mechanism can be used to lock the housings 480, 482 in desired positions.

The bimanual arm trainer 100 also includes a reciprocating translation mechanism 700 that operatively connects the two arm holders 400, 410 such that the motion of one arm holder 400, 410 is mirrored in the other arm holder 400, 410. In other words and similar to the '226 application, the user uses his/her unaffected arm to move his/her paretic (weak) arm. The mechanism 700 is disposed on the underside of the table 170. In the illustrated embodiment, the mechanism 700 is in the form of a series of pulleys and belts that couple the two holders 400, 410 so that they behave in the same manner during use. In particular, there are four (4) pulleys 800, 810, 820, 830 disposed below the table 170. Pulleys 800, 810 are located under each pivot point of the arm holders 400, 410. More specifically, the pulley 800 is operatively connected to the shaft 430 of the holder 400 and the pulley 810 is operatively connected to the shaft 430 of the holder 410. The pulleys 800, 810 thus move with the housings 480, 482 when the housings 480, 482 are moved for adjustment thereof.

Pulley 820 is located at the front of the table and is disposed below the first pivot 401 (and is operatively coupled to the pivot shaft thereat) and pulley 830 is located at the front of the table and is disposed below the second pivot 403 (and is operatively coupled to the pivot shaft thereat). The pulley 800, 820 define a first pulley pair and the pulley 810, 830 define a second pulley pair.

The mechanism includes a plurality of belts that are operatively coupled to at least two of the pulleys. In the illustrated embodiment, there is a first belt 840 that is coupled to the pulleys 800, 820; a second belt 850 that is coupled to the pulleys 810, 830; and a third belt 860 is coupled to the pulleys 820, 830.

The series of pulleys 800, 810, 820, 830 and belts 840, 850, 860 is configured to cause the motion of one of the arm holders 400, 410 to be replicated in the other arm holder 400, 410. The belt and pulley system causes the rotating arms to be linked such that moving one arm laterally forces the contralateral arm to also move laterally (i.e., away from one another). On the other hand, moving one arm medially causes the other arm to also move medially (i.e., the arms move toward each other).

Belt tension adjusting devices 870 can be provided along each of the belts 840, 850, 860 to control and adjust the tension of the belt. Any number of different types of tensioning regulating devices suitable for use with belts can be used.

The lower portion 487 of each housing can serve as a guide for the respective belt in that side walls of the lower portion 487 can contain the respective belt.

In addition, each arm holder can include a mechanism 1100 for measuring the degree of angular motion of the arm(s) of the user. In particular, one or more potentiometers 1100 can be used to measure the degree of angular motion of one or more of the arm holders 400, 410. In one embodiment, there are two potentiometers 1100 used to measure the degree of angular motion of each of the arm holders 400, 410. By having two separate potentiometers, the accuracy of the devices can be checked and also allows for different types of testing and measuring. For example, this arrangement allows for the ability to use just one arm for testing and some training. The potentiometers are thus coupled to the rotating portion of the arm holders and in particular, can be mounted to the pulleys that are operatively coupled to the respective shafts 430 of the arm holders 400, 410. In any event, the potentiometers are mounted to measure the degree of movement (angular rotation) of each of the arm holders 400, 410.

As also shown, the distance between the pivot points defined by shafts 430 of the respective arm holders 400, 410 can be adjusted by lifting a pin and moving the housing 480, 482 relative to the table 170. As shown, the table 170 can include a plurality of openings (holes) 179 in which the pin of each housing 480, 482 can be inserted to lock the housing 480, 482 in place relative to the table 170. Since the housings pivot at points 401, 403, such swinging (pivoting) movement of the housing 480, 482 is permitted.

Once the housings 480, 482 are locked in a selected position relative to the table 170, the arm holders 400, 410 pivot relative to the housings 480, 482 and the table 170. In particular, the shaft 430 of the first arm holders 400 defines a first arm holder pivot indicated at 10 and the shaft 430 of the second arm holder 410 defines a second arm holder pivot indicated at 11 (FIG. 3). The pivoting of these arm holders 400, 410 is what causes the attached belts to move about the respective pulleys to accomplish the motion described herein (i.e., both arm holders 400, 410 move in unison either laterally or medially as described herein).

The bimanual arm trainer 100 can be connected a computer (device 300) using a traditional connection, such as a USB cable, to provide feedback and motivation to the user. Software running on the computer 300 can present games and other motivational feedback to enhance the effectiveness of the therapeutic session.

The information from the movement sensors described herein can be used in several different ways—1) track each patient's performance over time; 2) immediate feedback to patients while they are performing the exercise; and 3) as input for video games that will be used to increase motivation.

The adjustability of the parts of the trainer 100 allow for the user to position the various parts at optimal locations to perform the rehabilitative exercises.

Computer Implemented System and Rehabilitative Software

As previously mentioned, the bimanual arm trainer 100 preferably is part of a computer implemented system 1000 that includes one or more computing devices 300. The computing device(s) 300 can be in the form of a personal computer, a mobile device, a tablet, a work pad, etc. FIGS. 1-2 show the computing device 300 in the form of a laptop 300 disposed on a stand 310.

An exemplary computer system is shown in FIG. 8, which is a high-level diagram illustrating an exemplary configuration of the computer implemented system 1000. The system 1000 includes one or more computing devices 300. In one arrangement, computing device(s) 300 a can be a personal computer or laptop (as shown) or server. In other implementations, computing device(s) 300 can be a tablet computer, or a mobile device/smartphone, for example. It should be understood that computing device(s) 300 of the system 1000 can be practically any computing device and/or data processing apparatus capable of embodying the systems and/or methods described herein. As understood by those of skill in the art, the computing device 300 can comprise a host machine that runs one or more of the modules in a virtualized environment, and, as such, can be scaled or executed on a variety of machines.

The computing device 300 includes one or more hardware processors 2202 and at least one memory 2204. Processor(s)

2202 serve to execute instructions for software that can be loaded into memory 2204. The computing device 300 can also include storage 2206. Memory 2204 and/or storage 2206 are preferably accessible by processor(s) 2202, thereby enabling processor(s) 2202 to receive and execute instructions stored on memory 2204 and/or on storage 2206. Memory 2204 can be, for instance, at least one random access memory (RAM) or any other suitable volatile or non-volatile computer readable storage medium. In addition, memory 2204 can be fixed or removable. Storage 2206 can take various forms, depending on the particular implementation. For example, storage 2206 can contain one or more components or devices such as a hard drive, a flash memory, a rewritable optical disk, a rewritable magnetic tape, or some combination of the above. Storage 2206 can also be fixed or removable.

One or more software modules 2208 are encoded in storage 2206 and/or in memory 2204. The software modules 2208 can comprise one or more software programs or applications having computer program code or a set of instructions executed in processor 2202. Such computer program code or instructions for carrying out operations for aspects of the systems and methods disclosed herein can be written in any combination of one or more programming languages, including an object oriented programming language, such as Ruby, Java, Smalltalk, C++, Python, and JavaScript, or the like. The program code can execute entirely on computing device 300, partly on computing device 300, as a stand-alone software package, partly on computing device 300 and partly on a remote computer/device, or entirely on the remote computer/device or server. In the latter scenario, the remote computer can be connected to computing device 300 through any type of network, including a local area network (LAN) or a wide area network (WAN), or the connection can be made to an external computer (for example, through the Network/Internet 2210 using an Internet Service Provider).

One or more software modules 2208, including program code/instructions, are located in a functional form on one or more computer readable storage devices (such as memory 2204 and/or storage 2206) that can be selectively removable. The software modules 2208 can be loaded onto or transferred to computing device 300 for execution by processor (s) 2202. It should be understood that in some illustrative embodiments, one or more of software modules 2208 can be downloaded over a network to storage 2206 via one or more network interfaces 2212 from another device or system for use within the computing device 300. For instance, program code stored in a computer readable storage device in remote server(s) 2214 or remote computing device(s) 2216 can be downloaded over Network/Internet 2210 from the server(s) 2214 or device(s) 2216 to the computing device 300.

Preferably, included among the software modules 2208 is a bimanual arm training program 2218 and sensor module 2220 which are executed by processor 2202. It will be understood that the software modules 2208 can include other training programs beyond the one described herein. During execution of the software modules 2208, and specifically the bimanual arm training program 2218 and sensor module 2220, the processor 2202 configures the computing device 300 to perform various operations relating to the customizable pull assembly. For example, the bimanual arm training program 2218 can be used by the user as part of a training regimen.

With continued reference to FIG. 8, one or more databases 2222 are also preferably stored in storage 2206. As will be described in greater detail below, database(s) 2222 can contain and/or maintain various data items and elements that are utilized throughout the various operations of system 1000, including but not limited to, sensory feedback that is obtained during the execution and performance of the bimanual arm training program and other saved features.

It should be noted that although database(s) 2222 is depicted as being configured locally to computing device 300, in certain implementations database(s) 2222 and/or various of the data elements stored therein can be located remotely (such as on a remote server 2214 or remote computing device 2216) and connected to computing device 300 through Network/Internet 2210, in a manner known to those having ordinary skill in the art.

As referenced above, it should be noted that in certain implementations, such as the one depicted in FIG. 8, one or more user remote devices (e.g., remote server(s) 2214, remote computing device(s) 2216) can be in periodic or ongoing communication with computing device 300 thorough a computer network such as the Internet 2210.

As also referenced above, network interface(s) 2212 can be any interface that enables communication between the computing device 300 and external devices, machines and/ or elements. Preferably, network interface(s) 2212 include, but are not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 300 to other computing devices and/or communication networks such as private networks and the Internet 2210. Such connections can include a wired connection or a wireless connection (e.g. using the IEEE 802.11 standard), though it should be understood that communication interface(s) 140 can be practically any interface that enables communication to/from the computing device 300.

With continued reference to FIG. 8, in one or more embodiments, the computing device(s) 300 can further include one or more input devices such as a keyboard, mouse, track ball and the like, and a display 2228. The display 2228 can include a screen or any other such presentation device that enables the system to instruct or otherwise provide feedback to the user regarding the operation of the system 1000. By way of example, display 2228 can be a digital display such as an LCD display, a CRT, an LED display, or other such 2-dimensional display as would be understood by those skilled in the art. By way of further example, a user interface and the display 2228 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, control functions, etc. So when the touch screen is touched, interface communicates this change to processor(s) 2202, and settings can be changed or user entered information can be captured and stored in the memory 2204.

In the illustrated embodiment, the display 2228 can be the screen of the laptop type computer shown in FIGS. 1-2.

Training Programs

Described herein, in accordance with one or more embodiments, is a bimanual arm training program 2218. In one or more embodiments, the bimanual arm training program can comprise one or more training exercises in the form of games, which are designed to track and monitor the training movements of the user, while providing the user with an interactive game to sustain the user's attention. The bimanual arm training program 2218 is intended for use with the bimanual arm trainer 100 that is disclosed and illustrated herein or, alternatively, can be configured for use in another type of rehabilitative trainer.

In one or more embodiments, the program 2218, as shown and described in FIGS. 9-16 is an outdoor adventure game that is intended to not only capture the attention of the patient (user) and motivate the patient (who is using the bimanual arm trainer 100), but also serves to track and monitor the progress of the user. For example, certain sensory feedback is stored in memory and can be used to generate an overall score or scores for the user. While the score(s) may be presented in terms of a rowing score in the case of the Canoe Adventure game (as described in further detail below), the score relates more to the overall degree of movement of the limbs (body parts) being exercised and thus, can be presented to the user in any number of different forms depending upon the "type" of game that the user is interacting with, e.g., rowing versus some other form of movement.

As mentioned herein, the trainer 100 includes a number of sensors and other hardware to monitor and record the movements of the various moving components of the trainer 100. In particular, as the user moves his/her arms, the motion of the two arm holders 400, 410 can be tracked and this feedback is used by the software to graphically represent the user's arm on the display and graphically depict, in real time, the movement of the arm holders 400, 410.

The various elements and components of program 2218 will be further appreciated with reference to the method of operating bimanual arm training program as described below, in conjunction with FIGS. 9-16. More specifically, FIGS. 9-16 describe and show an embodiment of the bimanual arm training program entitled "Canoe Adventure". In this embodiment, the program comprises a virtual canoe adventure in which the user's therapeutic arm movements in the bimanual arm trainer 100 correspond with the arm movements of a virtual person in the canoe shown on the display screen 2228. In this program, the virtual person completes several tasks while moving down a river in a canoe, the tasks including rowing, catching apples, and catching water. The user's goal is to complete the arm movements that correspond to those of the virtual person in the canoe. The user receives one or more "Canoe Adventure scores" at the end of each "run" down the river, with the user's score(s) being dependent upon how well the user mimics the arm movements of the virtual person shown on the display screen 2228. Each of the three tasks, rowing, catching apples, and catching water, requires a different arm or hand movement by the user, and all three tasks contribute to the user's total Canoe Adventure score.

For the rowing task, as the virtual person canoes along the river, the virtual person will pass buoys in the river that will mark the user's progress. The user's rowing score will depend on how far the user is able to extend and flex his or her arms to mimic the rowing movements of the virtual person and how well the user can time his or her arm strokes to a metronome (that will be both auditory and visual) and to phantom arm strokes of the virtual person shown on the display screen 2228.

After the virtual person has passed the target number of buoys, the virtual person will have the opportunity to collect falling fruit (e.g., apples) in a basket. As the canoe moves toward the shore, fruit (apples) will fall from trees near the river. As the apples fall, the user extends and rotates his or her arms, and the arm movements of the virtual person will correspond with the user's arm movements. The number of apples collected by the virtual person (based on the user's arm movements) will be counted and recorded in the user's score. In an optional task, the virtual person can also collect (catch) water from a waterfall, where the collecting of the water is based on the finger movements of the user. Thus, this task can be completed if the user is able to move his or her fingers. The waterfall option will be available to the user in the future if he or she is not currently able to move his or her fingers, but is able to at a later time.

Figure 9:
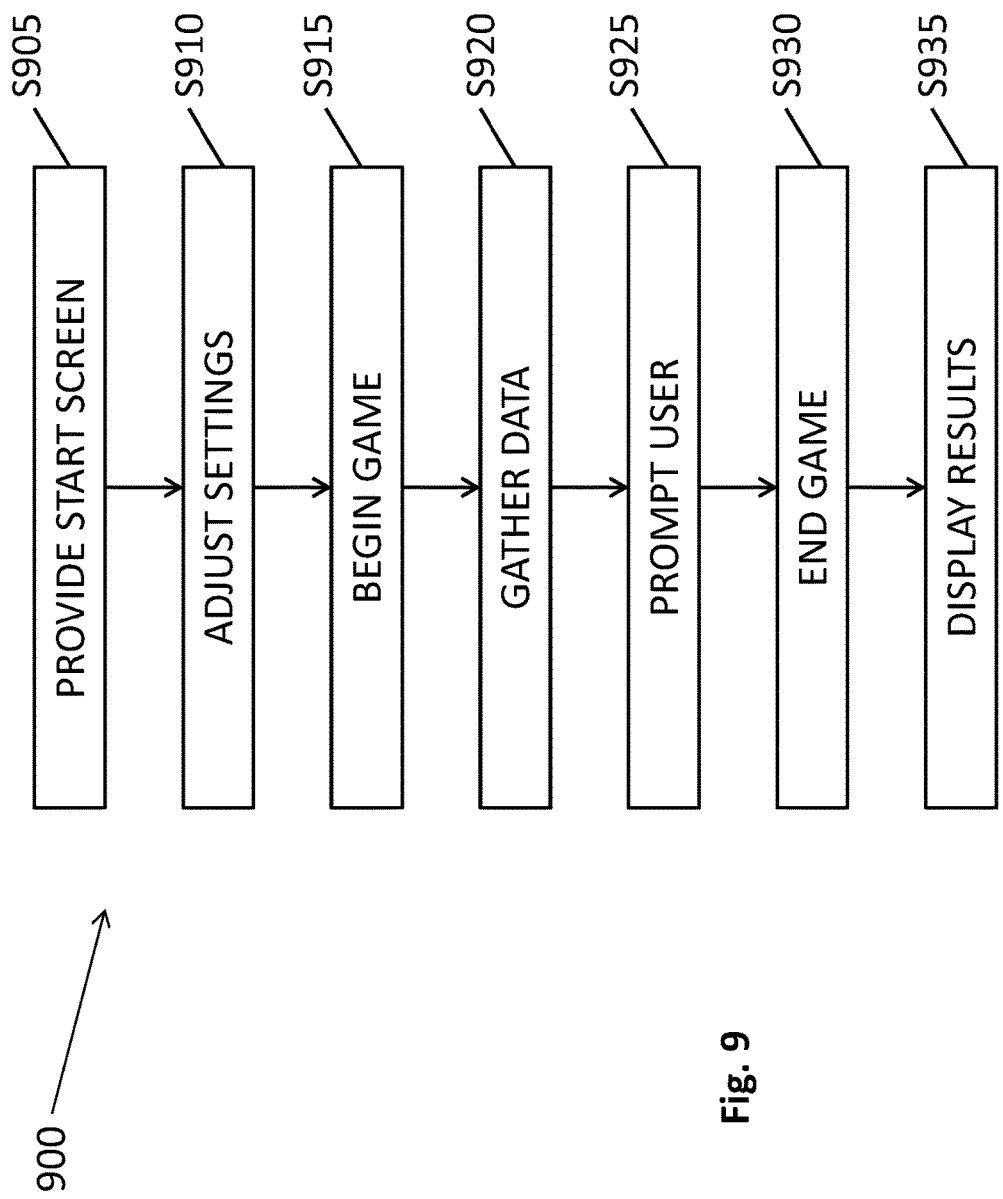
FIG. 9 is a flow diagram illustrating a routine, including a number of steps, that is part of arm training software.

There are three general types of arm movements for the user in the training program (e.g., Canoe Adventure): arm extension/flexion, forearm pronation/supination, and grip pressure (squeezing hand grip 600). The sensors of the bimanual arm trainer 100 track all the movement of the user's arms. For example, the arm extension/flexion movements of the user can be sensed by the sensor device 650 and/or potentiometer. Further, in the bimanual mode, the elbow movements (arm extension/flexion movements) of both arms are linked such that the extension (or flexion) of one arm will help produce the same movement in the other arm. For certain tasks in the Canoe Adventure, such as rowing, the user's goal is to attempt move both arms at the same time, while for other tasks, the user will only attempt to move one arm. For instance, in one or more embodiments, in the tasks that include forearm pronation/supination and/or grip pressure movements, the movements of one arm are not linked from one arm to the other in the bimanual arm trainer 100 (i.e., the tasks are "unimanual"). The one or more sensors for forearm pronation and supination record all of the rotational movements of the user's forearm. The grip pressure sensor records the tension in the user's hand as he or she grips the hand grip 600. The arm movements of the user with regards to the tasks of the Canoe Adventure are described in greater detail below in conjunction with FIGS. 9-16. FIG. 9 shows a flow diagram showing routines that illustrates broad aspects of a method operating bimanual arm training program in accordance with one or more embodiments of the present application. It should be appreciated that several of the logical operations described herein are implemented (1) as a sequence of computer implemented acts or program modules running on system 1000, and/or (2) as interconnected machine logic circuits or circuit modules within the system 1000. The implementation is a matter of choice dependent on the requirements of the device (e.g., size, energy, consumption, performance, etc.). Accordingly, the logical operations described herein are referred to variously as operations, steps, structural devices, acts, or modules. As referenced above, several of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 10:
FIG. 10 illustrates a first (main or home) screen of a canoe adventure software program (a rowing game) that is designed to be used with the trainer of the present invention.

FIG. 9 shows a flow diagram showing routine 900 that illustrates a broad aspect of the method of the present application in accordance with at least one embodiment. The method begins at step S905, where the processor 2202 executing one or more software modules 2208, including preferably bimanual arm training program 2218, configures computing device 300 to provide a start screen on the display 2228 for the bimanual arm training program, the start screen having a plurality of actionable fields. Herein, "actionable fields" generally includes any area of a screen that receives and responds to user input, such as a button or an area in which the user can input text (e.g., a text box) and that is processed by program 2218 accordingly. An exemplary start screen of the bimanual arm training program is shown at FIG. 10. In the embodiment of FIG. 10, the bimanual arm training program is in the form of a "Canoe Adventure" program, which includes several games such as rowing, catching apples, and catching water. The start screen of FIG. 10 includes several actionable fields including a "start game" button 1002, a "settings" button 1004, and an "exit" button 1006. In one or more embodiments, the start screen can have other actionable fields such as volume controls, "screen minimize" or "screen maximize" buttons, and the like.

It should also be noted that in one or more embodiments, the program 2218 can feature one or technical settings pages (screens). For example, in one or more embodiments, the program 2218 can feature "Min/Max Settings" and "Port/Pin Settings" screens. In one or more embodiments, these technical settings screens can be accessed from the start screen via user input (e.g., by holding down the "CTRL" key and hitting the "ENTER" key on the keyboard). In other embodiments, the technical setting screens can be accessed from the settings screen. Clicking on either port/pin settings or min/max settings will prompt a login with password. In one or more embodiments, the password for the Port/Pin Settings is "alpha" and the password for the Min/Max Settings is "bravo". On the technical settings screens, the technical settings (e.g., port/pin settings, min/max settings) for the game(s) can be modified. The port/pin settings enable the bimanual arm trainer sensors to connect to the computer 300. The min/max settings are adjustable for different shoulder widths and arm length among all users. Under normal operation, the port/pin settings do not have to be changed if the USB connection from the BAT to the computer is plugged into the correct slot. If, however, a different slot is required, then the port/pin settings page will need to be opened.

At step S910, the processor 2202 executing one or more software modules 2208, including preferably bimanual arm training program 2218, configures computing device 300 to adjust the settings of the bimanual arm training program to fit the specific needs of the patient (user). In one or more embodiments, on the start screen, the settings button can be activated via user input on computing device 300 (e.g., by the user activating the settings button with a mouse click on the button). In at least one embodiment, the settings button can be activated by a remote computing device (e.g., remote computing device 2216 or remote server 2214), such as by user input by a network administrator. Upon activation of the settings button, the processor 2202 executing one or more software modules 2208, including preferably bimanual arm training program 2218, configures computing device 300 to provide a settings screen on the display 2228 for the bimanual arm training program, the settings screen having a plurality of actionable fields. On the settings screen, the settings for the training program can be adjusted (via user input) to fit the specific needs of the patient (user). For example, a physical therapist, physician or other person in charge of constructing the patient's rehabilitation regime can select which settings are appropriate for the particular patient.

Figure 11:
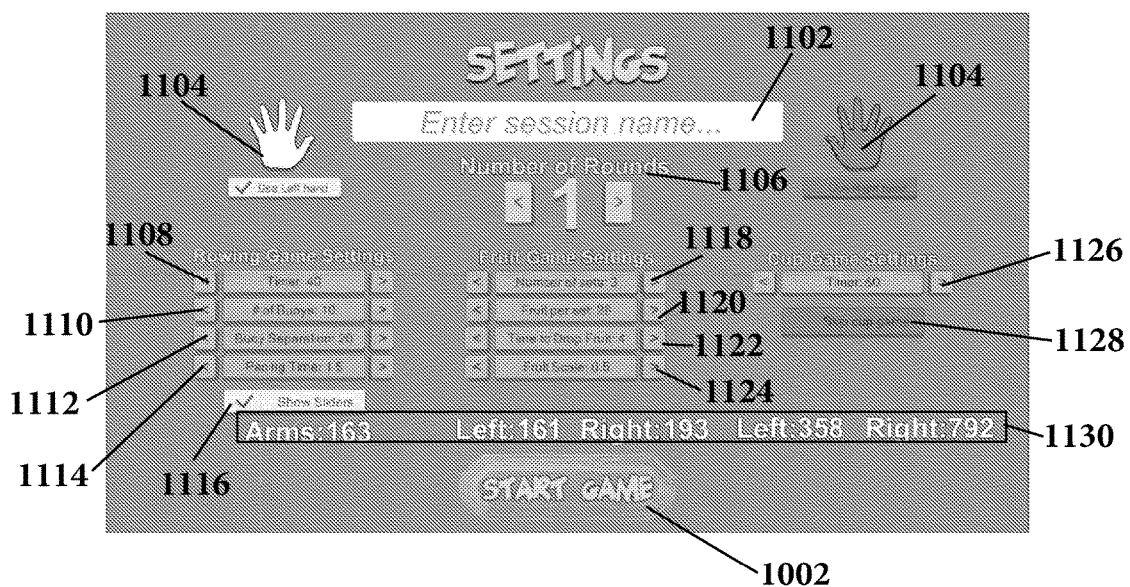
FIG. 11 is a screen shot of a settings page in which a user can input certain game related information.

FIG. 11 shows an exemplary settings screen for the Canoe Adventure program. As shown in FIG. 11, the settings screen can have various actionable fields corresponding with different settings for the Canoe Adventure.

For example, as shown in FIG. 11, the settings screen can include a field for entering a name of the session (1102), such as the name of the patient. The settings screen can also include one or more buttons for choosing which hand (arm) of the user is used (1104). More specifically, these buttons 1104 can be used to select which hand is the user's weak hand, and this selection is used for all of the unimanual tasks (e.g., forearm pronation/supination and grip pressure tasks). The settings screen can further include a field controlling the number of rounds the user is playing (1106). This settings field allows the user to set how many cycles of each task (e.g., rowing, catching fruit) will be done for the session. For instance, a setting of "three rounds" means there would be a total of three rowing rounds, with each round of rowing followed by a round of catching fruit, and optionally a round of collecting water.

The settings screen can also include one or more buttons for controlling the settings for each individual task in the Canoe Adventure (e.g., rowing game, fruit game, optional cup game [water collection game]). For example, as shown in FIG. 11, for the rowing game settings, the settings screen can include one or more buttons (such as arrows) for setting the timer (1108), the number of buoys (1110), the distance between the buoys ("buoy separation", 1112), and pacing time (1114).

For instance, in this embodiment the timer buttons 1108 allow the user to set the timer for the rowing game in seconds. For example, a setting of "45 seconds" means that the user will row for 45 seconds before moving to the fruit catching (e.g., apple catching) task. In other embodiments, the timer setting can use minutes rather than seconds. In at least one embodiment, the setting buttons for the number of buoys (1110) allow the user to set the number of buoys present in each round of rowing. The user's goal is to row smoothly to the pace of the metronome in order to pass as many buoys as possible. The number of buoys can be counted and displayed after each session. Similarly, the settings buttons for the buoy separation (1112) allow the user to set the distance between the buoys. In at least one embodiment (as shown in FIG. 11), the higher the number for this setting, the farther the user has to row in order to reach each buoy. Finally, the settings buttons for the pacing time (1114) allow the user to set the pacing time of the metronome. In at least one embodiment (as shown in FIG. 11), the higher the number for the pacing time, the slower the pace.

In at least one embodiment, the settings screen can also include a "show sliders" button 1116. Activating the show sliders button 1116 (e.g., clicking the button via mouse click), results in the showing of a metronome visual slider in the center of the screen during game play. In addition to the auditory metronome, the visual slider provides additional feedback to the user regarding the ideal rowing pace.

Referring again to FIG. 11, in one or more embodiments of the settings screen, the fruit game settings can include one or more buttons such as "number of sets" button(s) 1118, "fruit per set" button(s) 1120, "time to drop fruit" button(s) 1122, and "fruit scale" button(s) 1124. For instance, in this embodiment, the "number of sets" button(s) 1118 allow the user to set the number of times or sets that fruit will fall from the trees during each round. The "fruit per set" button(s) 1120 allows the user to set the number of apples that will fall for each set. The "time to drop fruit" button(s) 1122 allow the user to set the number of seconds that fruit will fall. In one or more embodiments, the higher the number in this setting, the more time will elapse before all of the fruit falls in each set. The "fruit scale" button(s) 1124 allows the user to set the size of the fruit. In one or more embodiments, a higher number will increase the size of the fruit.

With continued reference to FIG. 11, in one or more embodiments of the settings screen, the cup game (collecting water game) settings can include timer button(s) 1126, and "skip cup game" button 1128. In this embodiment, the timer button(s) 1126 allow the user to set the amount of time the user has to catch the water falling from the waterfall. The "skip cup game" button 1128 allows the user to either include the cup game or to bypass it for a given session for the user (for instance, if the user cannot move his or her fingers).

In one or more embodiments, the settings screen can further include one or more sensor readings 1130. For example, as shown in FIG. 11, the sensor readings 1130 are numbers (in this case, five numbers) that indicate the readings of the sensors. These numbers can be used if the person monitoring the user's training progress (e.g., therapist, physician) wants to record data that captures the user's ability to perform the movements prior to or following a session. For example, the therapist/physician may want to record the baseline ability of the user to extend and flex at the elbow (e.g., the "Arms" sensor reading), pronate and supinate the forearms (e.g., the "Left" and "Right" sensor readings under "Fruit Game Settings"), and grip force (e.g., the "Left" and "Right" sensor readings under "Cup Game Settings").

It should be understood that in at least one embodiment, the settings buttons for each task can take the form of other types of actionable fields such as a text box (e.g., for entering a numerical value for the particular setting) a slider/track bar, or toggle button. In one or more embodiments, the settings screen can also include a "start game" button 1002, which can allow the user to begin the game once the settings selections have been made.

Returning to FIG. 9, at step S915 the processor 2202 executing one or more software modules 2208, including preferably bimanual arm training program 2218, configures computing device 300 to begin the game. In one or more embodiments, the processor 2202 configures computing device to begin the game in response to activation (e.g., mouse click) of the "start game" button 1002. In one or more embodiments, the "start game" button 1002 can be activated from either the start screen or the settings screen. Upon activation of the "start game" button 1002, the computing device 300 is configured to provide the game play screen on the display screen 2228.

Figure 12:
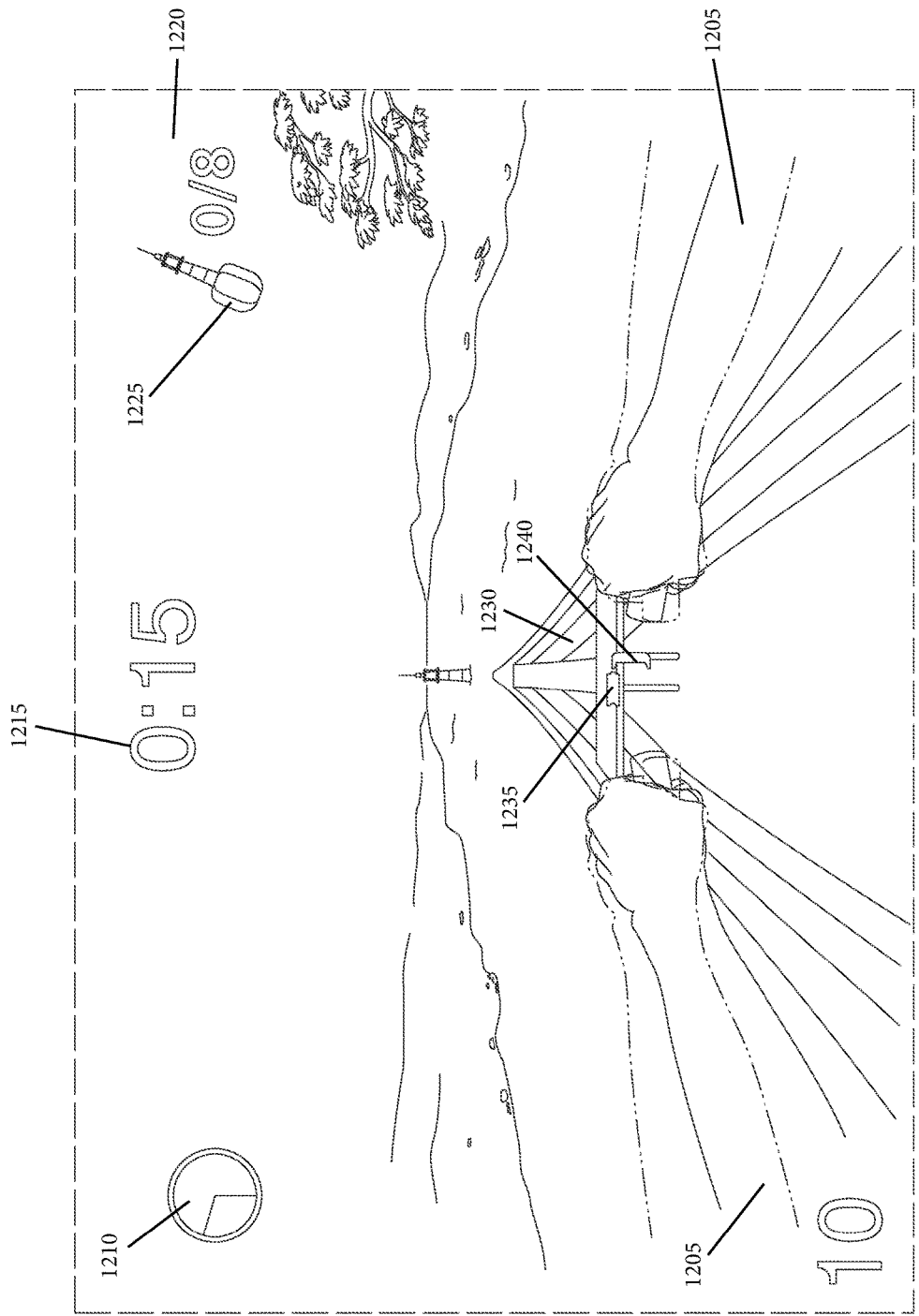
FIG. 12 illustrates a game playing screen of the canoe adventure game.

An exemplary game play screen for the Canoe Adventure is shown at FIG. 12. Shortly after the game play screen appears, the arms of the virtual person (virtual arms) on the screen 2228 will extend and grab the oars. At that point, the user can begin the rowing game by extending his or her arms. In one or more embodiments, there are several displays superimposed on the game play screen during the rowing game, which provide instant feedback to the user. For example, as shown at FIG. 12, the game playing screen during the rowing game can include a circle 1210 at the upper left corner of the screen that indicates the distance moved along the river. The same icon can represents the user's movement during subsequent games (e.g., fruit catching and water collecting games) as well. The number 1215 at the top center of the screen (the number "39" in FIG. 12) indicates how many seconds remain for the task. The fraction 1220 at the upper right corner ("0/8" as shown in FIG. 12) next to the buoy icon 1225 displays how many buoys have been passed (numerator) over the maximum number of buoys available (denominator). The maximum number of buoys can be entered (or adjusted) on the settings screen.

In embodiments in which the metronome is being used, the icons at the front of the boat 1230 between the hands provide a visual method to time the rowing strokes. The horizontal bar 1235 on the left icon is synched to the auditory metronome. For maximum speed, the user extend his or her arms when the horizontal bar 1235 moves up, and flexes them when it moves down. The vertical icon 1240 on the right tracks the user's movements. The vertical icon 1240 moves up and down depending on whether the user is extending or flexing his or her arms. The more closely the vertical icon 1240 tracks the horizontal icon 1235, the faster the boat will move on the display screen 2228. During the rowing game, the user rows (moves his or her arms) until the countdown timer (1215) reaches "0". At that point, the boat shown on the display screen 2228 will move to the right or left side of the river for the next task (e.g., catching fruit).

In one or more embodiments, during the rowing game, the processor 2202 configures the computing device 300 to show phantom virtual arms (phantom arms) (separate from the virtual arms 1205) on the display screen 2228, where the phantom arms correspond with the ideal rowing pace based on the selected settings for the user. As such, the movement of the phantom arms depicted on the screen (display 2228) represents movement that is intended to be mimicked by the user in order for the user to optimize his or her score and optimize his or her therapeutic exercises. Said differently, the goal of the user is to mimic the pace and movement of the phantom arms, such that the virtual arms (which correspond with the user's arm movements) match the phantom arms. Thus, ideally, the graphically represented virtual arms preferably move at the same speed as the phantom arms and are at least substantially superimposed therewith during and as the rehabilitative exercise (rowing game) is being performed on the trainer 100.

Figure 13:
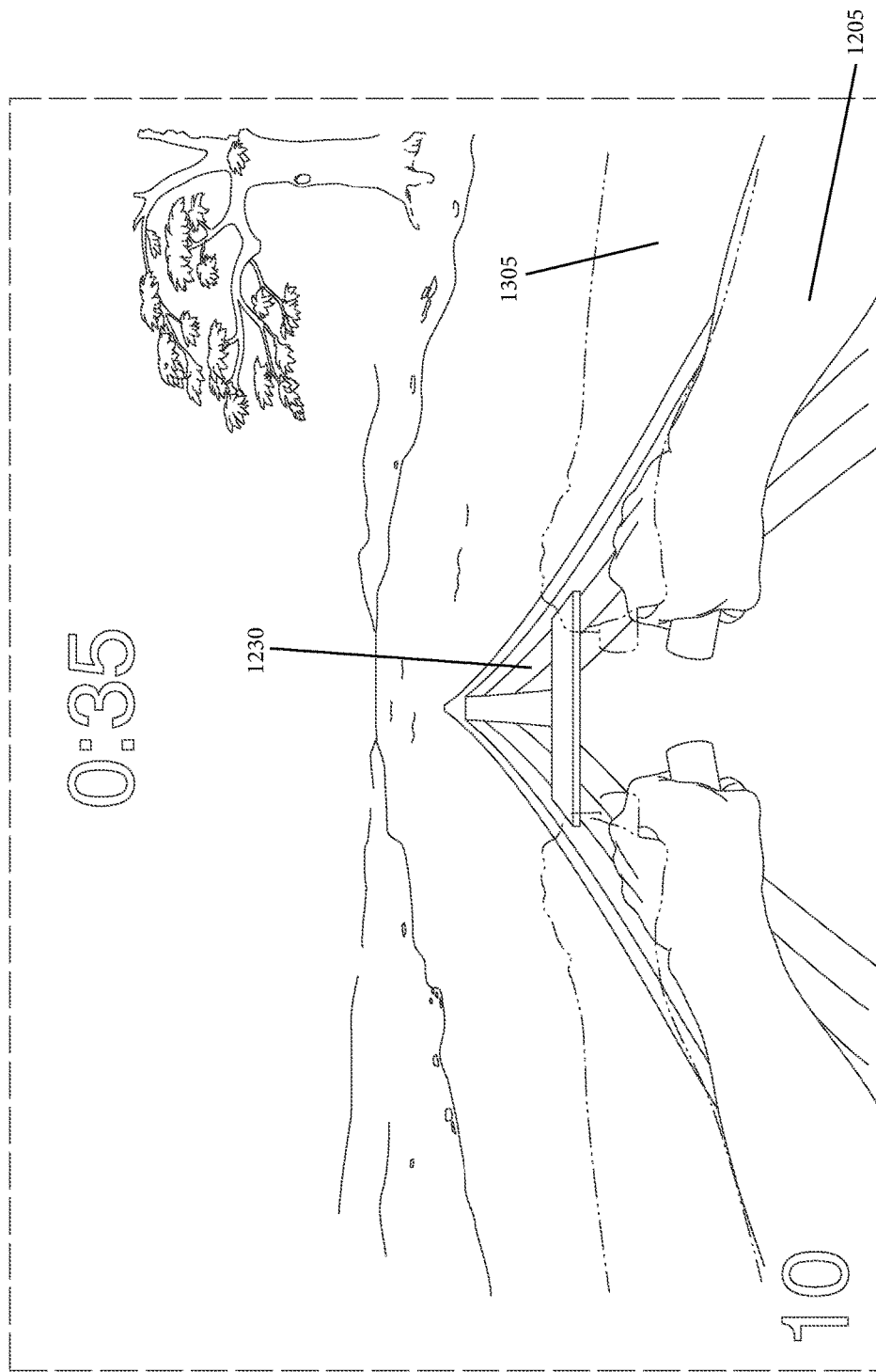
FIGS. 13 and 14 show exemplary screenshots of the rowing game showing both virtual arms (user simulated arms) and the phantom arms (pace arms)
Figure 14:
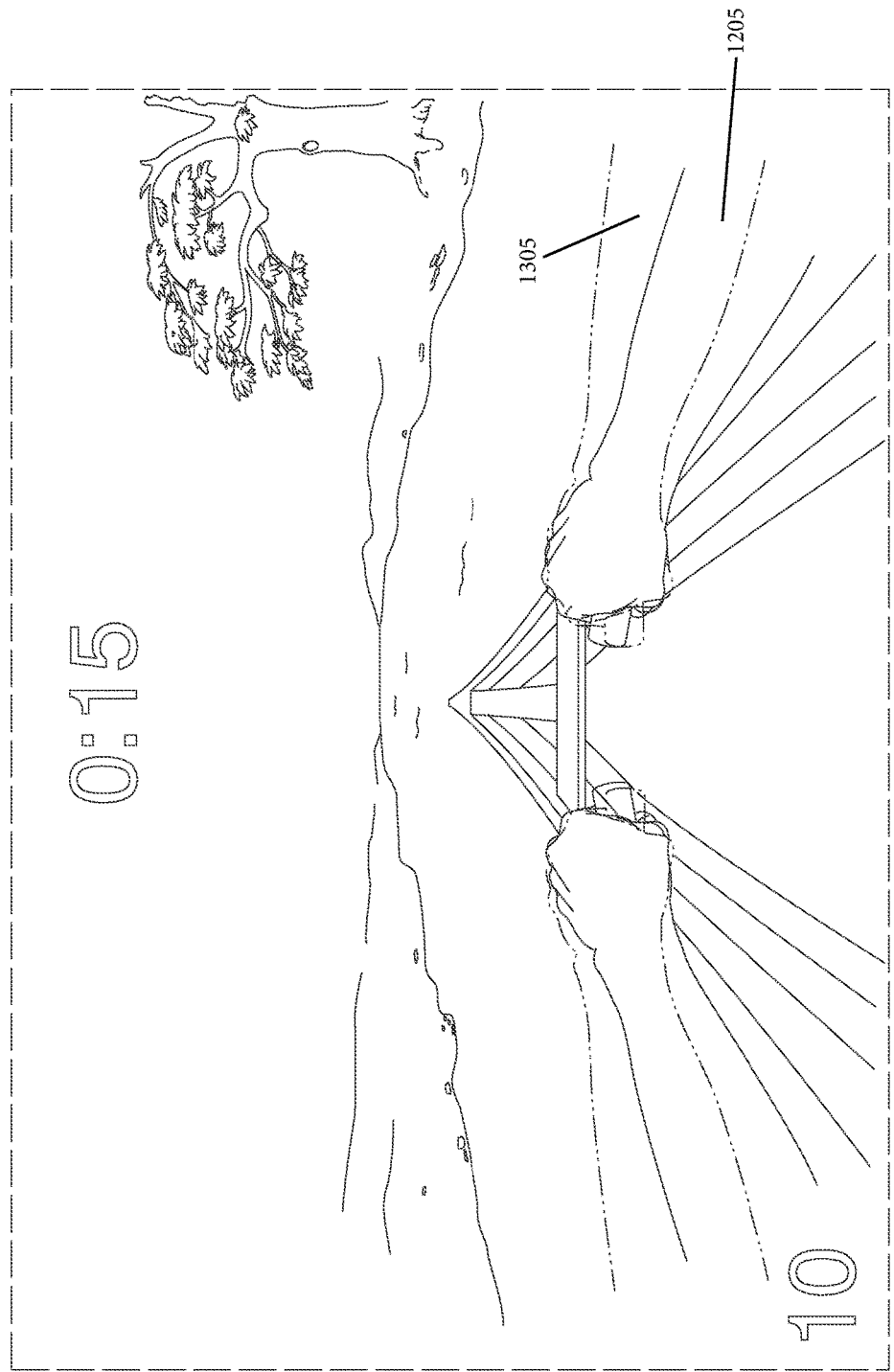

FIGS. 13 and 14 show an exemplary screenshots of the rowing game showing both the virtual arms 1205 and the phantom arms 1305. In FIG. 13, the phantom arms 1305 that are displayed on the screen 2228 are in front of the virtual arms 1205 that correspond with the patient's (user's) movements (e.g., the movements of the two arm holders 400, 410). As such, because the virtual arms 1205 do not match the ideal pace set by the phantom arms 1305, the user's movements are out of sync with the ideal rowing pace. In FIG. 14, the virtual arms 1205 are substantially superimposed over the phantom arms 1305, which indicates that the user's movements match or at least substantially match the ideal pace for that particular rowing game. In at least one embodiment, the processor 2202 can configure the computing device 300 to display additional visual indicia on the screen 2228 to show the user whether he or she is matching the ideal pace for that particular game. For example, a colored (e.g., green) glow can appears under the virtual and/or phantom arms if the user is matching or substantially matching the ideal rowing pace, and a different colored (e.g., red) glow can appear under the virtual and/or phantom arms if the user is not matching the ideal rowing pace.

In one or more embodiments, the speed of the boat 1230 (canoe) is based almost entirely on the ability of the patient (user) to match the pace of the phantom arms 1305. In other words, the phantom arms 1305 provide a baseline from which the user's performance can be judged and provide a goal/ideal movement to the user since the movement and speed of the user's depicted arms (virtual arms 1205) can be immediately judged relative to the movement and speed of the phantom arms 1305. Again, as part of the rehabilitation program using the bimanual arm training program 2218, the user's arm movements (if done correctly) should result in the virtual arms 1205 mirroring the motion of the phantom arms 1305.

It should be appreciated that the movement of the phantom arms 1305 is programmable and variable, in that the speed of the phantom arms 1305 can be programmed and selected by the user on the settings screen (i.e., pacing time buttons 1114). Thus, speed of the phantom arms 1305 shown on the display screen 2228 can be associated with a certain skill level of the user. For example, a slower speed represents a lower skill/performance level, while a higher speed represents a higher skill/performance level. For users (patients) that have more limited limb movement, a lower setting is likely more appropriate.

It should also be understood that, in or more embodiments, the movement of the virtual arms 1205 of the user can be exaggerated in that while the actual distance traveled by the user's actual arms may only be a short distance, the software (program 2218) configures the computing device 300 to depict on the screen 2228 a greater degree of movement of the virtual arms 1205 of the user. In other words, the virtual arms 1205 of the user can be shown to complete a rowing cycle while in reality, the user's arms do not move in such a manner as to complete a rowing cycle.

Figure 15:
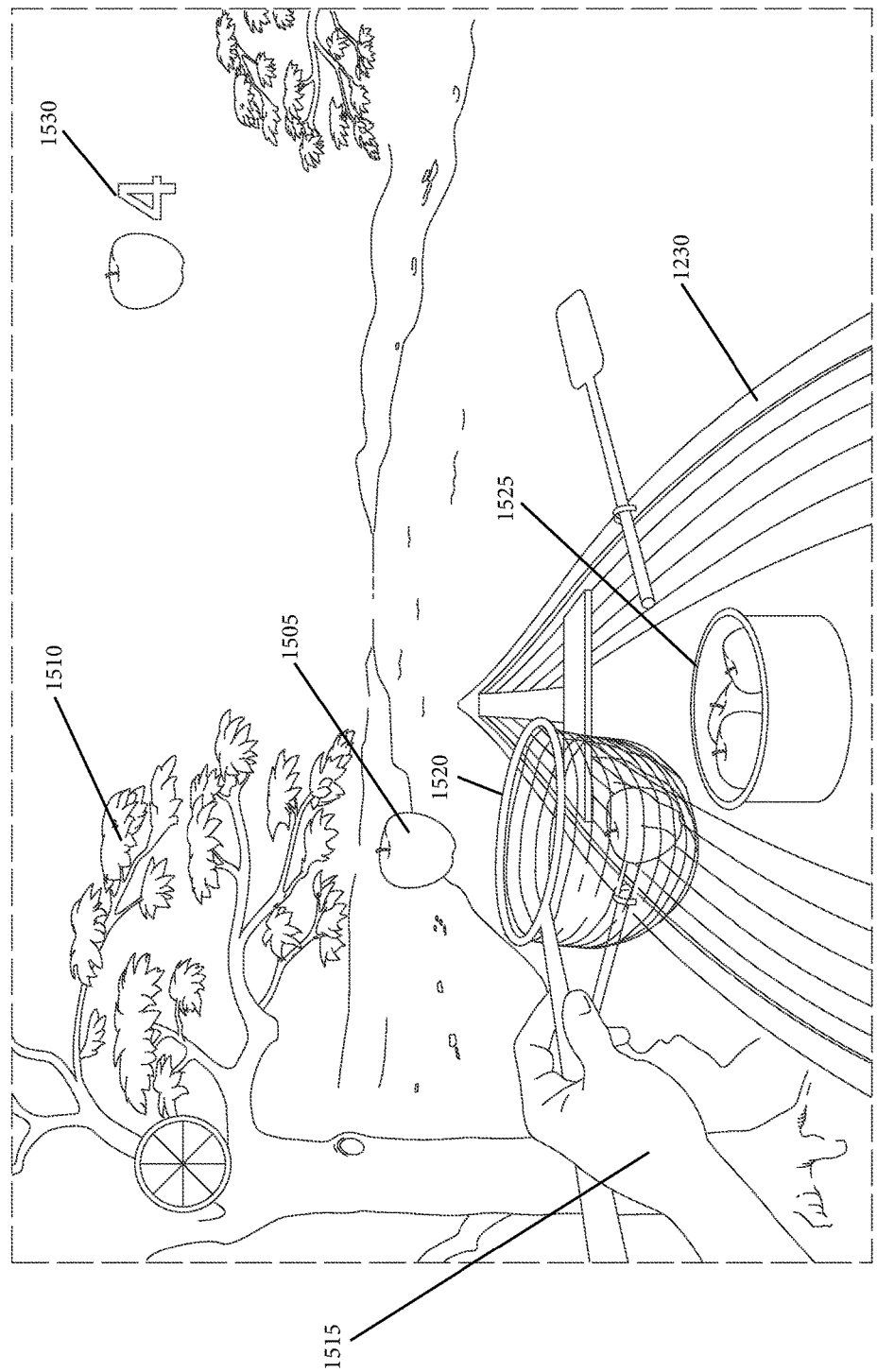
FIG. 15 is an exemplary game play screen for a catching apples game.

For the catching fruit (apples) game, the side of the river is on the user's weak side (as set on the settings screen). As the catching apples game begins, the processor 2202 executing one or more software modules 2208, including preferably bimanual arm training program 2218, configures computing device 300 to transform the image on the display screen 2228 such that the virtual hand closest to the side of the river now includes a basket. An exemplary game play screen for the catching apples game is shown at FIG. 15. As shown in FIG. 15, during the catching apples game, apples 1505 fall from the trees 1510 above the boat 1230. In order to catch the fruit (apples) 1505, the user supinates the left hand (as shown here, in FIG. 15) or right hand (if that is the weak hand). As shown in FIG. 15, the hand of the virtual person (1515) represents the weak hand of the user. The turning of the user's forearm will result in the rotation of the virtual basket 1520 to a position that will catch the fruit 1505. In one or more embodiments, after the apples 1505 have fallen, an instruction (e.g., prompt) can appear at the top of the display screen 2228 indicating that the user should "dump" the apples 1505 into the bucket 1525 located in the boat 1230 (e.g., by the user turning his or her forearm). The number 1530 next to the Apple icon at the upper right corner of the screen (in FIG. 15, "4") shows the number of apples that have been secured in the bucket 1525.

As mention above, the number of times apples will fall during the apple catching game can be set initially on the settings screen. Each time apples fall, the user supinates the weak forearm (which corresponds to the virtual arm 1515) to "catch" as many apples as possible in the basket 1520 followed by dumping them into the bucket 1525.

Figure 16:
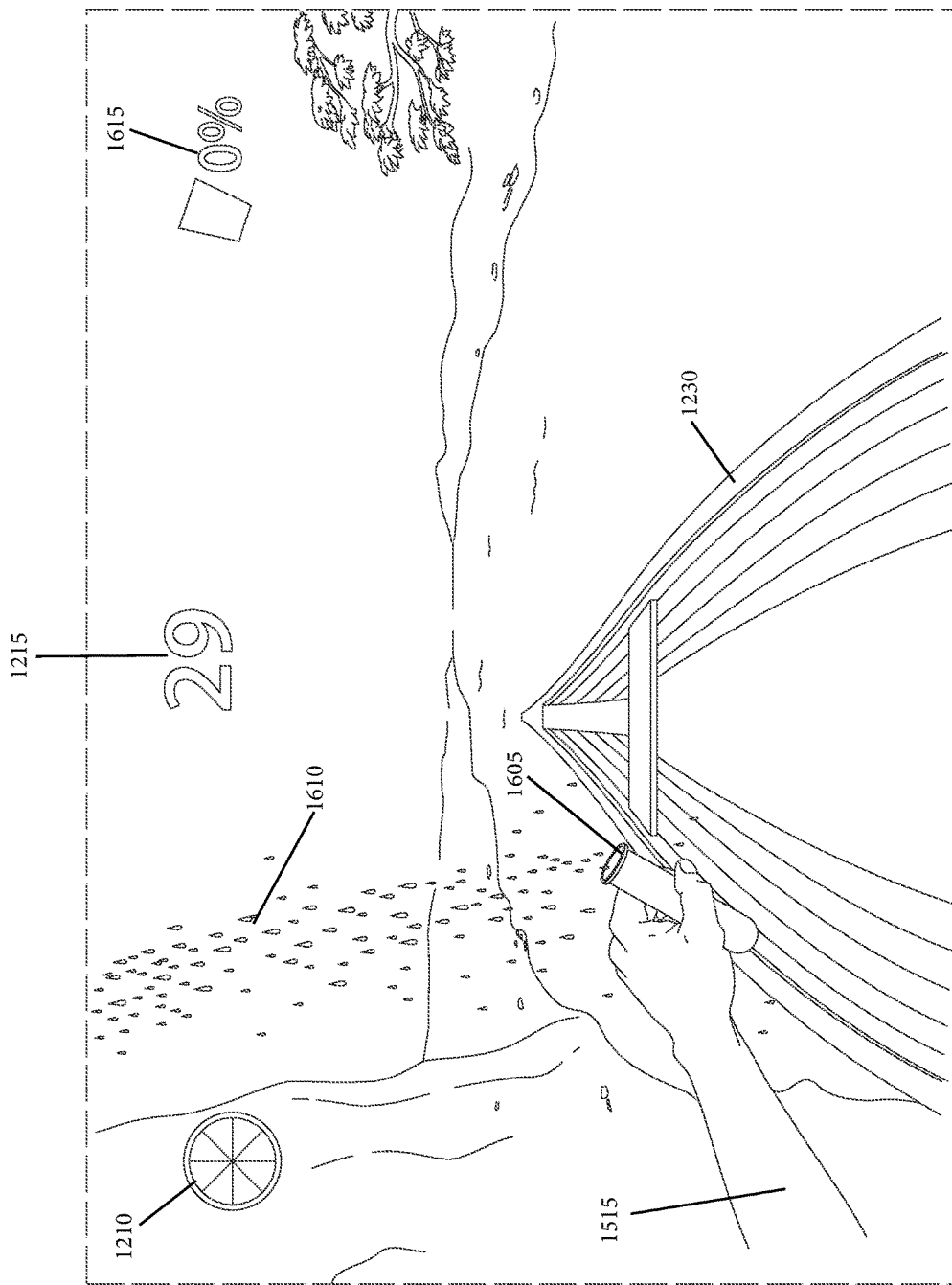
FIG. 16 is an exemplary game play screen for a collecting water game.

Once the target number of the catch and dump sequence has been reached, the processor 2202 executing one or more software modules 2208, including preferably bimanual arm training program 2218, configures computing device 300 to transform the image on the display screen 2228 to either the water collection game play screen (if that option was selected) or to the rowing game play screen if more than one round was entered on the initial settings screen. If the water collection game was selected in the settings screen, the processor 2220 configured computing device 300 to transform the image on the display screen 2228 such that the side of the river is now a waterfall rather than trees and the virtual hand closest to the side of the river (now includes a cylinder (rather than a basket) for collecting water. An exemplary game play screen for the collecting water game is shown at FIG. 16, wherein the screen includes a cylinder 1605 (for collecting water) and a waterfall 1610. In order to catch water falling from the waterfall 1610, the user extends his or her arm (corresponding to the virtual arm 1515) so that the hand of the virtual arm 1515 is under the water of the waterfall 1610. Then, in order to increase the diameter of the cylinder 1605 enabling more water to be collected, the user can open his hand. The countdown timer 1215 in the center of the screen indicates how many seconds remain. The percentage of the cup that contains water (1615) is shown on the upper right corner of the screen.

Returning to FIG. 9, at step S920 the processor 2202 executing one or more software modules 2208, including preferably bimanual arm training program 2218 and sensor module 2220, configures computing device 300 to gather sensor data. In one or more embodiments, the processor 2202 configures computing device 300 to receive data from one or more sensors of the bimanual arm trainer 100, the sensors being operatively connected to the computing device 300. During the games (e.g., rowing, catching fruit, collecting water), one or more of the sensors of the bimanual arm trainer 100 are configured to gather data based on the arm movements of the user during the game. For example, one or more potentiometers on the upstanding fixed post 620 can be configured to measure the angular motion of the user's wrist during the games, and transmit that data to the computing device 300. Similarly, a force sensor on the post 610 can be configured to measure grip force (strength) during the cup game, for example. The data gathered by the one or more sensors and transmitted to the computing device 300 can then be analyzed by the computing device 300 to determine the user's score for the one or more games, for example. The data gathered by the one or more sensors can also be used to provide cumulative data to the user to show the user's improvement (or regression) over a series of sessions.

At step S925 the processor 2202 executing one or more software modules 2208, including preferably bimanual arm training program 2218 and sensor module 2220, configures computing device 300 to display one or more prompts on the display screen 2228 to the user. During certain points during the game play, the processor 2202 can configure the computing device 300 to display one or more prompts on the screen 2228 to provide information to the user, such as informing the user to perform a certain task. For example, during the apple catching game, after the apples 1505 have fallen, the processor 2202 can configure the computing device 300 to display an instruction (e.g., prompt) on the display screen 2228 indicating that the user should "dump" the apples 1505 into the bucket 1525 located in the boat 1230. Additionally, in one or more embodiments, the processor 2202 can configure the computing device 300 to display instructions to the user regarding his or her rowing pace (e.g., instruction telling the user to speed up or slow down his or her rowing pace to match the ideal pace). Further, in at least one embodiment, the processor 2202 can configure the computing device 300 to display instructions to the user before each game (e.g., rowing game) starts for how to perform particular tasks (e.g., arm movements) in that game. It should be appreciated that any number of different prompts can be configured to be displayed on display screen 2228 during game play (or on the start screen or setting screen) in order to improve the experience of the user.

With continued reference to FIG. 9, at step S930 the processor 2202 executing one or more software modules 2208, including preferably bimanual arm training program 2218, configures computing device 300 to end the game. The processor 2202 can configure the computing device 300 to end the game once the all the games in the session have been played by the user, or alternatively during one of the games in response to user input (i.e., the user stopping the game in the middle of game play). In one or more embodiments, the game play screen can comprise an "end game" button (not shown), which allows the user to end the game via user input (e.g., mouse click on the "end game" button).

At step S935, the processor 2202 executing one or more software modules 2208, including preferably bimanual arm training program 2218 and sensor module 2220, configures computing device 300 to display the results of the games on the display screen 2228 to the user. In one or more embodiments, upon the ending of the game(s), the processor 2202 configured the computing device 300 to transform the screen on display 2228 from the game play screen to a results screen in which the results of the game are shown. The results screen can show the user's games score results and/or the statistical data from the one or more sensors, measuring the user's actual arm movements (e.g., grip force). In at least one embodiment, the results screen can show a comparison of the user's arm movement measurements from the sensors over time, thus showing the user's arm movement improvement or regression over time.

It should be appreciated that additional types of exercises can be created for providing guidance and motivation and tracking of the patient's rehabilitation efforts in accordance with the bimanual arm trainer of the present application. It should also be appreciated that by providing an engaging game type environment that is displayed in front of the patient (user), the patient will be more likely to adhere to the recommended rehabilitative program and be more likely to perform the program (exercise) in the manner prescribed by the physical therapist, physician, etc. Thus, the embodiments and arrangements of the present systems and methods (as discussed above), which provide a computer implemented method and computer system for providing a customizable pull assembly, are merely illustrative of the present systems and methods It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems and methods disclosed herein.

It should also be understood that although some of the foregoing description has been directed to systems and methods for designing and/or manufacturing customizable pull assemblies, the system and methods disclosed herein can be similarly deployed and/or implemented in scenarios, situations, and settings far beyond the referenced scenarios. It can be readily appreciated that system 1000 can be effectively employed in one or more scenarios where in-person, real-world transactions can have advantages over virtual or electronic methods. It should be further understood that any such implementation and/or deployment is within the scope of the system and methods described herein.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Overall, the subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A bimanual arm trainer configured to provide therapeutic bimanual repetitive exercise to improve upper body movement and flexibility comprising:
    a top support having an upper surface and an opposing lower surface, wherein the top surface is elevated relative to a ground surface;
    first and second arm holders that are pivotable relative to the top support;
    first and second arm holder housings that are pivotably coupled to the top support and can be moved into a plurality of different positions and locked in place in one of the plurality of different positions relative to the top support, the first arm holder being pivotably coupled to the first arm holder housing and the second arm holder being pivotably coupled to the second arm holder housing; and
    a reciprocating translation mechanism that operatively connects the first and second arm holders such that the motion of one of the first and second arm holders is mirrored in the other of the first and second arm holders.

2. The bimanual arm trainer of claim 1, further including an adjustable frame for supporting the top support, wherein the adjustable frame is adjustable to allow a distance between the top support and the ground surface to be changed.

3. The bimanual arm trainer 2, wherein the adjustable frame comprises first and second scissor jack structures, the first scissor jack structure being positioned along a first side edge of the top support and the second scissor jack being positioned along an opposing second side edge of the top support.

4. The bimanual arm trainer of claim 3, further including a base and wherein each of the first and second scissor jack structures includes: (a) a bottom slotted bracket fixedly attached to the base; (b) a slotted upper support which is fixedly attached to the top support; (c) a first side support that is pivotally attached to the slotted upper support and is slidingly coupled to the bottom slotted bracket; and (d) a second side support that is pivotally attached to the bottom slotted bracket and is slidingly coupled to the slotted upper support; and wherein the first and second side supports are pivotally coupled to one another.

5. The bimanual arm trainer of claim 4, further including a device for lowering and raising the top support relative to the ground surface, the device being operatively coupled to the first scissor jack structure.

6. The bimanual arm trainer of claim 5, wherein the device comprises a hand crank mechanism in the form of a linear actuator that includes a drive shaft that has a hand crank at one end and a first threaded portion at another end, the second side support having a threaded through hole formed therein, the first threaded portion passing through and mating with threads of the threaded through hole such that rotation of the drive shaft in a first direction causes the second side support to be driven in a first linear direction and rotation of the drive shaft in a second direction causes the second side support to be driven in a second linear direction, the linear movement of the second side support in either the first or second directions causes a change in an angle formed between the coupled first and second side supports, thereby either raising or lowering the top support.

7. The bimanual arm trainer of claim 1, wherein each of the first and second arm holders includes a base that has a downwardly extending shaft at a first end, a first arm retaining part being fixedly attached to a top surface of the base and a movable second arm retaining part being fixedly attached to a sliding rail that slidingly travels over the base so as to permit the movable second arm retaining part to be moved in either a direction toward or away from the fixed first arm retaining part.

8. The bimanual arm trainer of claim 7, wherein each of the first and second arm retaining parts has an open top for reception of an arm and includes at least one fastener extending across the open top for securing the arm within the respective first and second arm retaining parts.

9. The bimanual arm trainer of claim 7, wherein the second arm retaining part is positioned distal to the first arm retaining part.

10. The bimanual arm trainer of claim 7, further including a lock for locking the second arm retaining part in a desired position relative to the first arm retaining part.

11. The bimanual arm trainer of claim 7, further including a hand grip that is pivotably coupled to the sliding rail for allowing rotation of a hand about a wrist, the hand grip including a fixed post that is fixedly attached to the sliding rail and a rotatable upstanding post that is pivotally coupled to the fixed post and configured to be grasped by the hand, the rotatably upstanding post being spaced from and located proximal to the fixed post to allow the hand to be inserted between the fixed post and the rotatable upstanding post.

12. The bimanual arm trainer of claim 11, further including a sensor device associated with the hand grip and configured to measure wrist angular motion.

13. The bimanual arm trainer of claim 12, wherein the sensor device includes a first sensor carried by the fixed post and a second sensor carried by the rotatable upstanding post, the first sensor comprising a force sensor and the second sensor comprising a potentiometer configured to measure wrist angular motion.

14. The bimanual arm trainer of claim 12, wherein the sensor device communicates with a main processor.

15. The bimanual arm trainer of claim 1, wherein the pivoting of the first and second arm holders is independent from the pivoting of the first and second arm holder housings.

16. The bimanual arm trainer of claim 1, wherein each of the first and second arm holder housings includes a first elongated upper portion that extends above the upper surface of the top support and a second elongated lower portion that extends below the lower surface of the top support, the first and second elongated upper and lower portions extending outwardly from an end portion which is spaced from a rear edge of the top support, wherein distal ends of each of the first and second elongated upper and lower portions are rotatably coupled to the top support about a common pivot axis, thereby permitting the respective first and second arm holder housing to pivot relative to the top support.

17. The bimanual arm trainer of claim 16, wherein each of the first and second arm holders has a shaft that defines a pivot axis of the respect first and second arm holder and is received within the end portion of the respective first and second arm holder housing and is coupled to the reciprocating translation mechanism.

18. The bimanual arm trainer of claim 16, wherein the top support includes a first set of openings formed in a left side of the top support and second set of openings formed in a right side of the top support, each of the first and second sets of openings defining an arcuate shaped path, the first arm holder housing including a lock component that is received in one opening of the first set of openings to lock the first arm holder housing in place, the second arm holder housing including a lock component that is received in one opening of the second set of openings to lock the second arm holder housing in place.

19. The bimanual arm trainer of claim 1, wherein the reciprocating translation mechanism is disposed along the lower surface of the top support.

20. The bimanual arm trainer of claim 19, wherein the reciprocating translation mechanism comprises a plurality of pulleys and a plurality of belts that connect the first and second arm holders.

21. The bimanual arm trainer of claim 20, wherein the plurality of pulleys comprises a first pulley disposed at a first pivot axis about which the first arm holder pivots relative to the first arm holder housing, a second pulley disposed at a second pivot axis about which the first arm holder housing pivots relative to the top support, a third pulley disposed at a third pivot axis about which the second arm holder pivots relative to the second arm holder housing, and a fourth pulley disposed at a fourth pivot axis about which the second arm holder housing pivots relative to the top support, and wherein the plurality of belts comprises a first belt that is coupled to the first and second pulleys, a second belt that is coupled to the second and fourth pulleys and a third belt that is coupled to the third and fourth pulleys.

22. The bimanual arm trainer of claim 20, wherein the first belt is contained within a lower portion of the first arm holder housing and the third belt is contained within a lower portion of the second arm holder housing.

23. The bimanual arm trainer of claim 1, wherein the first arm holder includes a first device for measuring a degree of angular motion of the arm of a user by measuring rotation of the first arm holder and the second arm holder includes a second device for measuring a degree of angular motion of the arm of a user by measuring rotation of the second arm holder.

24. The bimanual arm trainer of claim 23, wherein each of the first and second devices comprises at least one potentiometer that measures the degree of angular motion of the respective arm holder.

25. The bimanual arm trainer of claim 1, wherein the first arm holder includes a first device for measuring a degree of angular motion of the arm of a user by measuring rotation of the first arm holder and the second arm holder includes a second device for measuring a degree of angular motion of the arm of a user by measuring rotation of the second arm holder.

26. The bimanual arm trainer of claim 21, wherein the first arm holder is coupled to the first pulley by a shaft that extends downwardly from the first arm holder and passes through the first arm holder housing and is coupled to the first pulley such that rotation of the first arm holder is translated into rotation of the first pulley, the second arm holder being coupled to the third pulley by a shaft that extends downwardly from the second arm holder and passes through the second arm holder housing and is coupled to the third pulley such that rotation of the second arm holder is translated into rotation of the third pulley, and wherein the first arm holder includes a first device for measuring a degree of angular motion of the arm of a user by measuring rotation of the first arm holder and the second arm holder includes a second device for measuring a degree of angular motion of the arm of a user by measuring rotation of the second arm holder, the first device being at least one potentiometer that measures the degree of angular motion of the first arm holder and is mounted to the first pulley and the second device being at least one potentiometer that measures the degree of angular motion of the second arm holder and is mounted to the third pulley.

27. The bimanual arm trainer of claim 21, further including a computer device supported by the top support, the computer device including a processor that executes software and memory, wherein the software includes a bimanual arm training program that is displayed on a display of the computer device.

28. The bimanual arm trainer of claim 27, wherein the bimanual arm training program is a simulated rowing game that is configured to receive input from a user concerning a level of play and displays, on the display, a pace set of arms that row at a speed based on the selected level of play and wherein a simulation of the user's arms is displayed and the movement of which is displayed on the display based on positioning data received from sensors associated with the first and second arm holders.

* * * * *